(12) United States Patent
Yamaguchi et al.

(10) Patent No.: US 11,975,772 B2
(45) Date of Patent: May 7, 2024

(54) STEERING CONTROL DEVICE

(71) Applicant: JTEKT CORPORATION, Osaka (JP)

(72) Inventors: Takafumi Yamaguchi, Kuwana (JP);
Takahiro Toko, Takahama (JP);
Nobuaki Kataoka, Okazaki (JP);
Yukinobu Ezaki, Kasugai (JP)

(73) Assignee: JTEKT CORPORATION, Osaka (JP)

( * ) Notice: Subject to any disclaimer, the term of this patent is extended or adjusted under 35 U.S.C. 154(b) by 548 days.

(21) Appl. No.: 17/129,053

(22) Filed: Dec. 21, 2020

(65) Prior Publication Data

US 2021/0197889 A1    Jul. 1, 2021

(30) Foreign Application Priority Data

Dec. 25, 2019   (JP) .................................. 2019-234366

(51) Int. Cl.
| | | |
|---|---|---|
| B62D 5/04 | (2006.01) | |
| B62D 5/00 | (2006.01) | |
| B62D 6/00 | (2006.01) | |
| B62D 15/02 | (2006.01) | |
| F16H 25/16 | (2006.01) | |
| G01D 5/14 | (2006.01) | |
| G01L 5/00 | (2006.01) | |

(52) U.S. Cl.
CPC ......... B62D 5/0469 (2013.01); B62D 5/0409 (2013.01); B62D 15/0215 (2013.01)

(58) Field of Classification Search
None
See application file for complete search history.

(56) References Cited

U.S. PATENT DOCUMENTS

| | | | | |
|---|---|---|---|---|
| 2020/0130733 A1* | 4/2020 | Hwang | .................. | B62D 5/001 |
| 2020/0309566 A1* | 10/2020 | Fujita | ...................... | G01L 5/221 |
| 2022/0041210 A1* | 2/2022 | Sakaguchi | ......... | B62D 15/0215 |

FOREIGN PATENT DOCUMENTS

| | | |
|---|---|---|
| DE | 10 2012 022 900 A1 | 5/2014 |
| EP | 3 409 562 A1 | 12/2018 |
| JP | 2016-155519 A | 9/2016 |

OTHER PUBLICATIONS

May 18, 2021 extended Search Report issued in European Patent Application No. 20217037.9.

* cited by examiner

*Primary Examiner* — Jonathan M Dager
*Assistant Examiner* — Laura E Linhardt
(74) *Attorney, Agent, or Firm* — Oliff PLC

(57) ABSTRACT

A steering control device includes an electronic control unit that stores an end position corresponding angle. The electronic control unit is configured to execute end strike relaxation control, to execute partial release control in a case where turning of a vehicle is attempted during execution of the end strike relaxation control, to make a non-following determination and acquire a release-time restriction position determination angle that corresponds to the absolute steering angle detected at a time when the electronic control unit determines that the movement of the steered shaft is restricted, and to permit update of the end position corresponding angle based on the release-time restriction position determination angle, and update the end position corresponding angle in a case where the update of the end position corresponding angle is permitted.

6 Claims, 13 Drawing Sheets

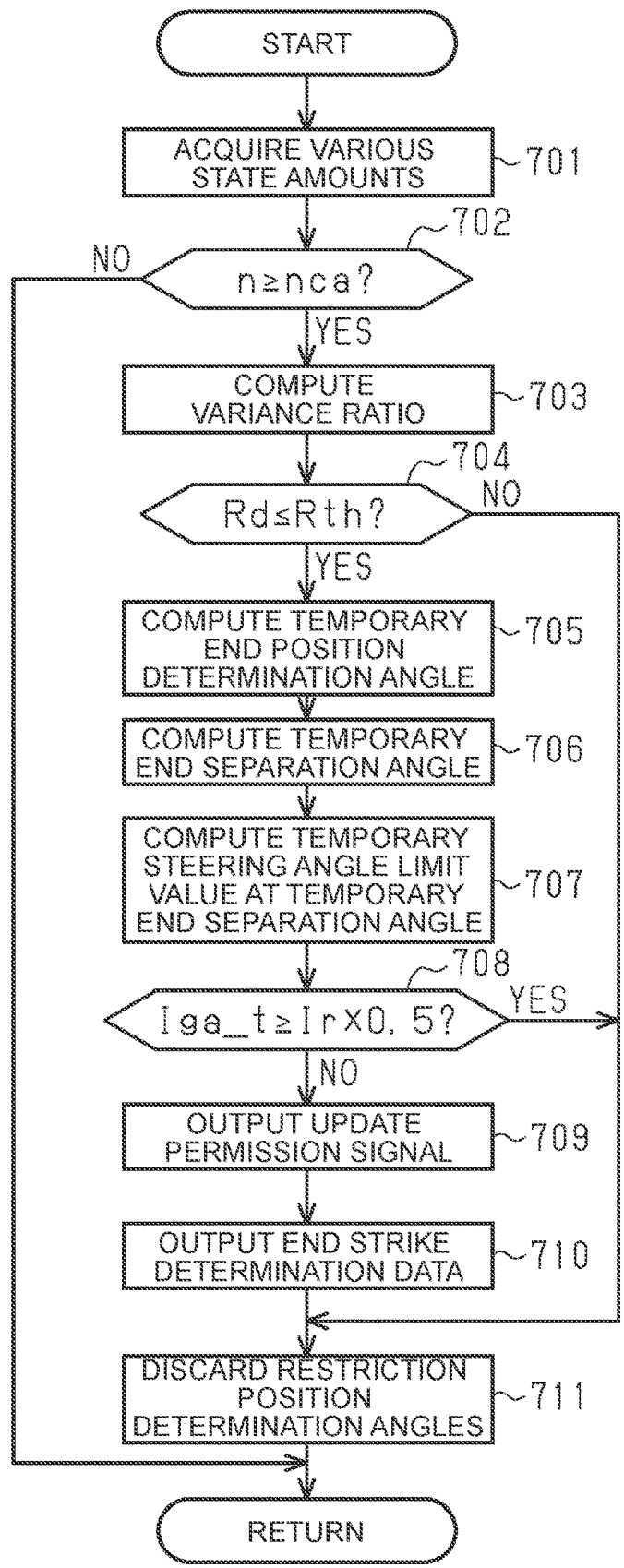

STEERING CONTROL DEVICE

CROSS-REFERENCE TO RELATED APPLICATION

This application claims priority to Japanese Patent Application No. 2019-234366 filed on Dec. 25, 2019, incorporated herein by reference in its entirety.

BACKGROUND

1. Technical Field

The disclosure relates to a steering control device.

2. Description of Related Art

There has been an electric power steering system (EPS) that includes an actuator driven by a motor, as a steering system for a vehicle. Some EPSs acquire a steering angle of a steering wheel as an absolute angle in a range including a range exceeding 360°, and perform various types of control on the basis of the steering angle. Japanese Unexamined Patent Application Publication No. 2016-155519 (JP 2016-155519 A), for example, discloses an EPS that executes, as an example of such control, end strike relaxation control for relaxing (i.e., reducing) the impact of a so-called end strike, in which a rack end which is an end portion of a rack shaft strikes a rack housing.

In the EPS according to JP 2016-155519 A, rack end positions, at which movement of the rack shaft is physically restricted by the end strike, are related to the steering angles, and the steering angles at such positions are stored as end position corresponding angles. The EPS relaxes (i.e., reduces) the impact of the end strike by reducing a target value for motor torque output from a motor in accordance with the separation of the steering angle from the end position corresponding angle.

SUMMARY

The stored end position corresponding angles may deviate from actual end angles, which indicate steering angles at which the end strike actually occurs, when the steering shaft is replaced to repair the vehicle, for example. If the stored end position corresponding angles deviate toward the neutral steering position with respect to the actual end angles, the target value for the motor torque may not be reduced sufficiently by executing the end strike relaxation control, and the impact of the end strike may not be reduced sufficiently. However, J P 2016-155519 A described above does not mention the deviation between the actual end angles and the stored end position corresponding angles, and there has been a request to develop a technique that reduces such deviation.

The disclosure provides a steering control device that reduces deviation of a stored end position corresponding angle toward a neutral steering position with respect to an actual end angle.

An aspect of the disclosure relates to a steering control device configured to control a steering system including a housing, a steered shaft housed in the housing so as to reciprocate, and an actuator that applies motor torque for causing the steered shaft to reciprocate using a motor as a drive source. The steering control device includes an electronic control unit configured to detect an absolute steering angle which is a rotational angle of a rotary shaft that is convertible into a steered angle of steered wheels coupled to the steered shaft, and which is indicated by an absolute angle in a range including a range exceeding 360°, compute a current command value corresponding to a target value for the motor torque output from the motor, and control driving of the motor such that an actual current value supplied to the motor matches the current command value. The electronic control unit stores an end position corresponding angle that indicates an end position at which movement of the steered shaft is restricted by an end strike in which the steered shaft contacts the housing, the end position corresponding angle being related to the absolute steering angle. The electronic control unit is configured to execute end strike relaxation control for correcting the current command value, in a case where an end separation angle is equal to or smaller than a predetermined angle, such that a decrease in the end separation angle is restricted, the end separation angle indicating a separation of the absolute steering angle from the end position corresponding angle. The electronic control unit is configured to execute partial release control for reducing a correction amount for the current command value determined through execution of the end strike relaxation control in a case where turning of a vehicle is attempted during the execution of the end strike relaxation control. The electronic control unit is configured to make a non-following determination as to whether the movement of the steered shaft is restricted during execution of the partial release control, based on a degree to which an angular velocity of the motor follows a target angular velocity, and acquire a release-time restriction position determination angle that corresponds to the absolute steering angle detected at a time when the electronic control unit determines that the movement of the steered shaft is restricted. The electronic control unit is configured to permit update of the end position corresponding angle based on the release-time restriction position determination angle, and update the end position corresponding angle in a case where the update of the end position corresponding angle is permitted.

With the configuration described above, movement of the steered shaft may be restricted at a virtual end position, which is closer to the neutral steering position than the actual end position at which the steered shaft actually contacts the housing, through execution of the end strike relaxation control. When the driver attempts to turn the vehicle in such a case, the correction amount for correcting the current command value is reduced through execution of the partial release control. Consequently, a limitation on the current command value due to execution of the end strike relaxation control is partially released to increase the current command value. Thus, the partial release control is executed to increase the current command value when the driver attempts to turn the vehicle, even if movement of the steered shaft is restricted at the virtual end position through execution of the end strike relaxation control, for example. Therefore, the steered shaft can be moved to the actual end position. As a result, it is possible to restrain a reduction in the vehicle performance in making sharp turns.

With the configuration described above, the end position corresponding angle is updated when update of the end position corresponding angle is permitted based on the release-time restriction position determination angle. Therefore, the deviation between the end position corresponding angle and the actual end angle can be reduced. The release-time restriction position determination angle is an angle acquired when it is determined that movement of the steered shaft is restricted during execution of the partial release control. That is, the release-time restriction position determination angle is acquired after the steered shaft is brought closer to the actual end position than the virtual rack end position through execution of the partial release control. Therefore, the release-time restriction position determination angle is considered to be an angle that is approximate to the actual end angle. Thus, it is possible to accurately determine whether the end position corresponding angle needs to be updated on the basis of the release-time restriction position determination angle which is close to the actual end angle.

In the steering control device according to the aspect described above, the electronic control unit may be configured to make a normal-time end strike determination as to whether the movement of the steered shaft is restricted while the partial release control is not executed, and acquire a normal-time restriction position determination angle that corresponds to the absolute steering angle detected at a time when the movement of the steered shaft is determined to be restricted; and the electronic control unit may be configured to permit the update of the end position corresponding angle based on the release-time restriction position determination angle and the normal-time restriction position determination angle.

With the configuration described above, update of the end position corresponding angle is permitted on the basis of not only the release-time restriction position determination angle but also the normal-time restriction position determination angle. Therefore, the end position corresponding angle can be updated even in the case where the deviation between the actual end angle and the stored end position corresponding angle is so large that the steered shaft may strike the housing before the end strike relaxation control is executed, for example.

In the steering control device according to the aspect described above, the electronic control unit may be configured to compute a steering angle limit value that decreases based on a decrease in the end separation angle in the case where the end separation angle is equal to or smaller than the predetermined angle; the electronic control unit may be configured to execute the end strike relaxation control by limiting an absolute value of the current command value to the steering angle limit value; the electronic control unit may be configured to compute an angle limit component that decreases based on an increase in the end separation angle, and compute the steering angle limit value based on a value obtained by subtracting the angle limit component from a rated current of the motor; the electronic control unit may be configured to compute the angle limit component such that the angle limit component computed during execution of the partial release control is smaller than the angle limit component computed while the partial release control is not executed; and a condition under which the non-following determination is established may include the absolute value of the current command value being equal to or larger than the steering angle limit value.

With the configuration described above, the condition under which the non-following determination is established includes the absolute value of the current command value being equal to or larger than the steering angle limit value, that is, the current command value being a maximum value with a limitation on the current command value released through the partial release control. Consequently, it is possible to reduce the possibility that an erroneous determination that movement of the steered shaft is restricted is made due to making the non-following determination in a state where sufficient motor torque is not output.

In the steering control device according to the aspect described above, a condition under which the non-following determination is established may include an absolute value of the angular velocity being smaller than a following-determination angular velocity threshold set based on the target angular velocity.

With the configuration described above, it is possible to appropriately determine whether the angular velocity of the motor follows the target angular velocity. In the steering control device according to the aspect described above, a condition under which the non-following determination is established may include an absolute value of an angular velocity variation amount being smaller than a start-determination angular velocity variation amount threshold, the angular velocity variation amount being a variation amount of the angular velocity.

Immediately after the partial release control is started, the motor is accelerating, but the angular velocity of the motor is still substantially zero, and does not follow the target angular velocity. With the configuration described above, in view of this respect, the condition under which the non-following determination is established includes the absolute value of the angular velocity variation amount being smaller than the start-determination angular velocity variation amount threshold such that the motor is not accelerating significantly. Therefore, it is possible to reduce the possibility that an erroneous determination that movement of the steered shaft is restricted is made immediately after the start of the partial release control.

In the steering control device according to the aspect described above, each of a sign of steering torque and a sign of a rotational direction of the motor for moving the steered shaft in one direction may be defined as positive and each of the sign of the steering torque and the sign of the rotational direction of the motor for moving the steered shaft in a direction that is opposite to the one direction may be defined as negative; and the electronic control unit may be configured to acquire the release-time restriction position determination angle in a case where a sign of the angular velocity is the same as the sign of the steering torque and an absolute value of the angular velocity is larger than a stop angular velocity threshold which indicates a stopped state of the motor after the electronic control unit determines that the movement of the steered shaft is restricted based on the non-following determination.

The non-following determination in each of the configurations described above may be established also in the case where the rotational direction of the motor is momentarily opposite to the steering direction. Therefore, when the release-time restriction position determination angle is acquired at the moment when the rotational direction of the motor is opposite to the steering direction, the release-time restriction position determination angle may deviate from the actual end angle. With the configuration described above, in this respect, the release-time restriction position determination angle is acquired in the case where the rotational direction of the motor is the same as the steering direction. Therefore, it is possible to reduce deviation of the release-time restriction position determination angle from the actual end angle.

With the aspect of the disclosure described above, it is possible to reduce deviation of the stored end position corresponding angle toward the neutral steering position with respect to the actual end angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart illustrating the process procedure for update permission performed by an update permission unit.

DETAILED DESCRIPTION OF EMBODIMENTS

Figure 1:
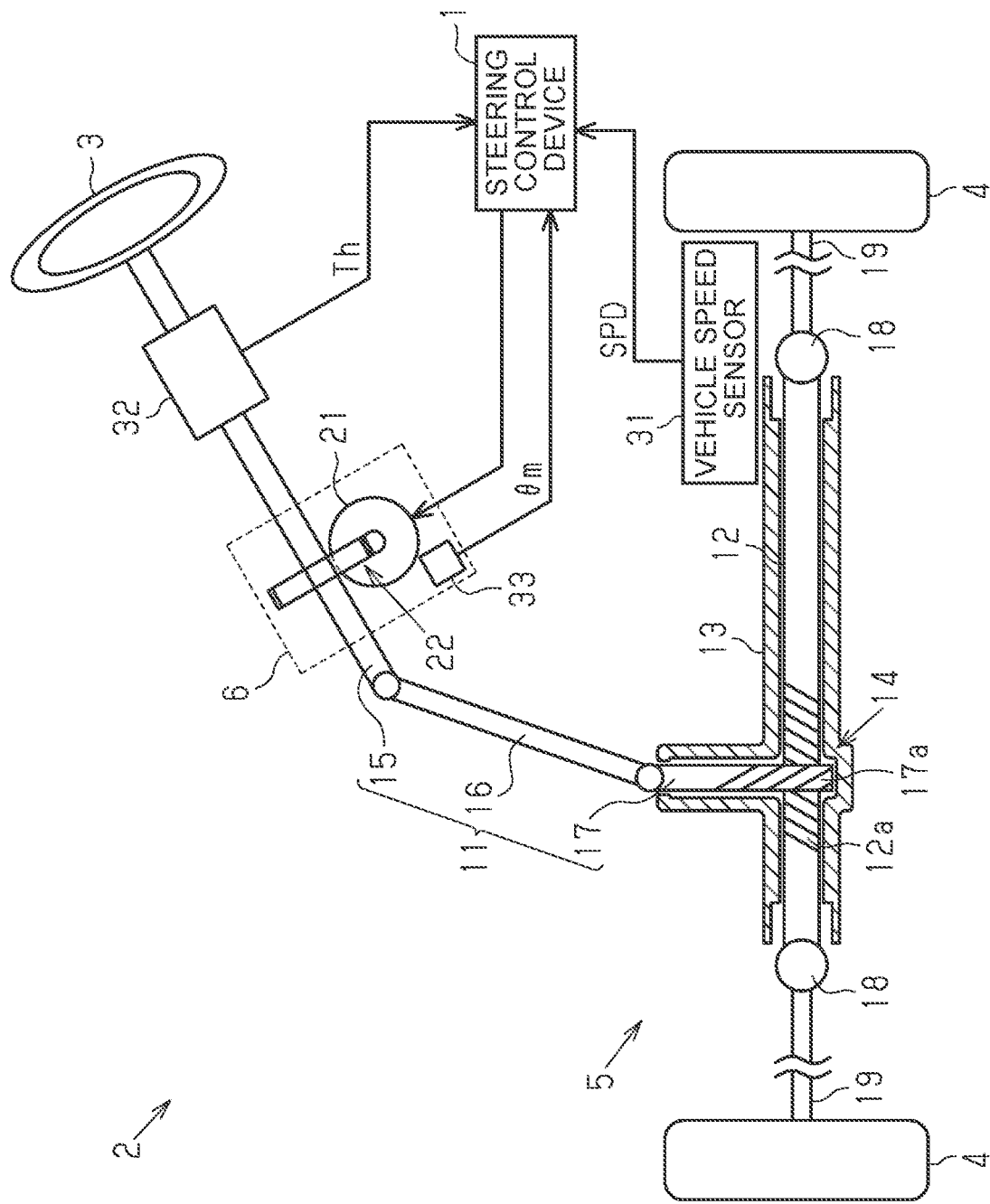
FIG. 1 illustrates a schematic configuration of an electric power steering system.

A steering control device according to an embodiment will be described below with reference to the drawings. As illustrated in FIG. 1, an electric power steering system (EPS) 2 as a steering system to be controlled by a steering control device 1 includes a steering mechanism 5 that steers steered wheels 4 on the basis of an operation on a steering wheel 3 performed by a driver. The EPS 2 also includes an EPS actuator 6 as an actuator that applies an assist force for assisting a steering operation to the steering mechanism 5.

The steering mechanism 5 includes a steering shaft 11 to which the steering wheel 3 is fixed, a rack shaft 12 as a steered shaft coupled to the steering shaft 11, and a rack housing 13 as a housing through which the rack shaft 12 is inserted so as to reciprocate. The steering mechanism 5 also includes a rack-and-pinion mechanism 14 that converts rotation of the steering shaft 11 into reciprocating motion of the rack shaft 12 in the axial direction. The steering shaft 11 includes a column shaft 15, an intermediate shaft 16, and a pinion shaft 17, which are coupled to each other and arranged in the stated order from the side on which the steering wheel 3 is positioned.

The rack shaft 12 and the pinion shaft 17 are disposed in the rack housing 13 with a predetermined intersection angle therebetween. The rack-and-pinion mechanism 14 is formed by meshing rack teeth 12a formed on the rack shaft 12 and pinion teeth 17a formed on the pinion shaft 17 with each other. Tie rods 19 are drivably coupled to respective ends of the rack shaft 12 via rack ends 18 which are ball joints provided at the shaft end portions. The distal ends of the tie rods 19 are coupled to knuckles (not illustrated) to which the steered wheels 4 are fitted. Thus, in the EPS 2, rotation of the steering shaft 11 in accordance with a steering operation is converted into axial movement of the rack shaft 12 by the rack-and-pinion mechanism 14, and this axial movement is transferred to the knuckles via the tie rods 19 to change the steered angle of the steered wheels 4, that is, the advancing direction of the vehicle.

The position of the rack shaft 12 at which the rack end 18 contacts the left end of the rack housing 13 is the position at which the rack shaft 12 is steered rightward to the maximum extent, and corresponds to the rack end position as the right end position. Meanwhile, the position of the rack shaft 12 at which the rack end 18 contacts the right end of the rack housing 13 is the position at which the rack shaft 12 is steered leftward to the maximum extent, and corresponds to the rack end position as the left end position.

The EPS actuator 6 includes a motor 21 as a drive source and a speed reduction mechanism 22 such as a worm and a wheel. The motor 21 is coupled to the column shaft 15 via the speed reduction mechanism 22. The EPS actuator 6 applies motor torque to the steering mechanism 5 as an assist force by transferring rotation of the motor 21 to the column shaft 15 with the speed of the rotation reduced by the speed reduction mechanism 22. A three-phase brushless motor is adopted as the motor 21 according to the present embodiment.

The steering control device 1 is connected to the motor 21 to control operation of the motor 21. The steering control device 1 includes a central processing unit (CPU) and a memory (not illustrated). The CPU executes a program stored in the memory in predetermined computation cycles. Consequently, various types of control are executed.

A vehicle speed sensor 31 that detects a vehicle speed SPD of the vehicle and a torque sensor 32 that detects steering torque Th applied to the steering shaft 11 through steering by the driver are connected to the steering control device 1. A rotation sensor 33 that detects a rotational angle θm of the motor 21 as a relative angle in the range of 360° is also connected to the steering control device 1. The steering torque Th and the rotational angle θm are each detected as a positive value in the case where the vehicle is steered rightward, and as a negative value in the case where the vehicle is steered leftward, for example. The steering control device 1 controls the operation of the EPS actuator 6, that is, an assist force applied in order for the steering mechanism 5 to cause the rack shaft 12 to reciprocate, by supplying drive electric power to the motor 21 on the basis of signals that indicate various state amounts input from the sensors.

Figure 2:
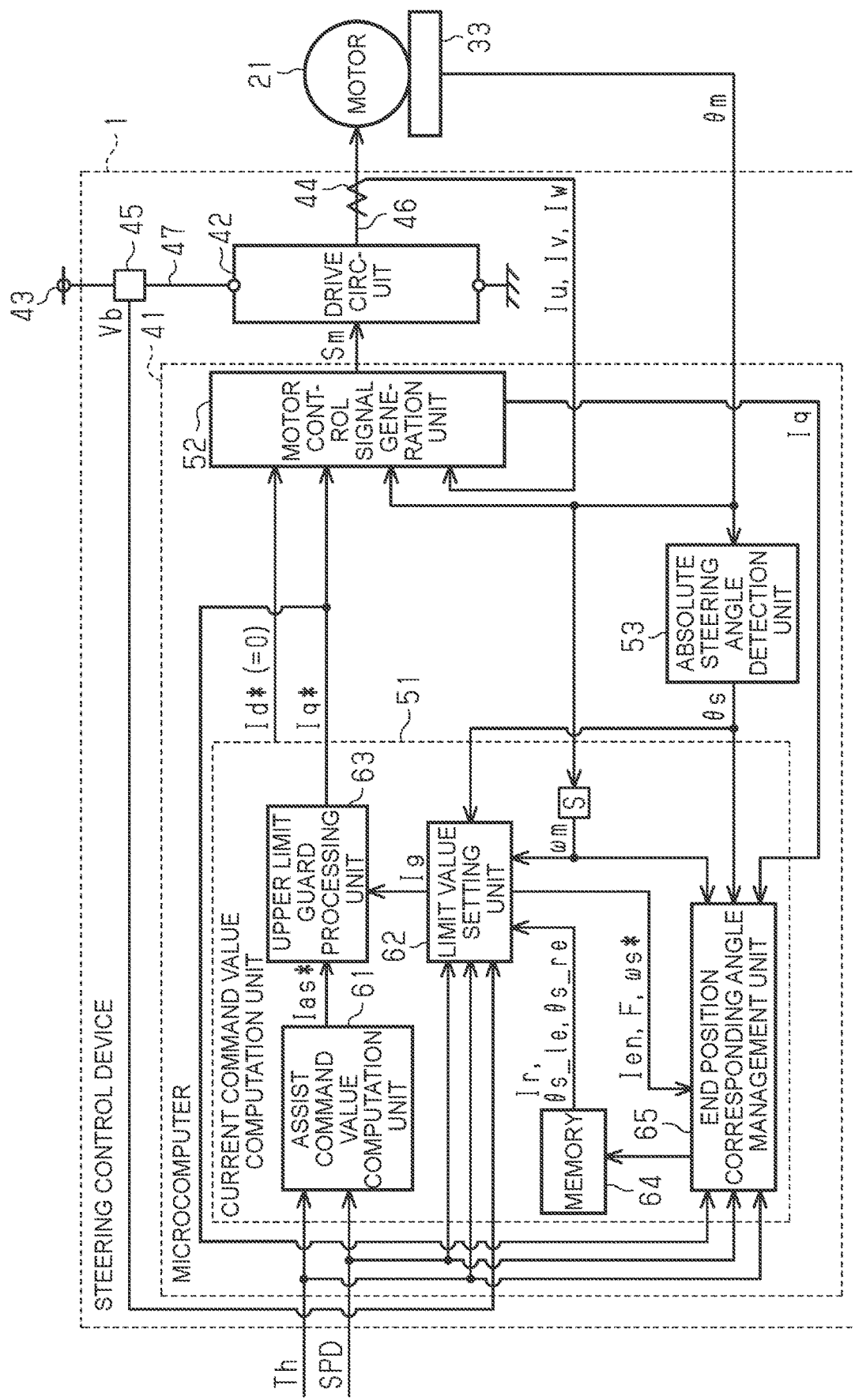
FIG. 2 is a block diagram of a steering control device.

Next, the configuration of the steering control device 1 will be described. As illustrated in FIG. 2, the steering control device 1 includes a microcomputer 41 that outputs a motor control signal Sm and a drive circuit 42 that supplies drive electric power to the motor 21 on the basis of the motor control signal Sm. In other words, the steering control device 1 includes an electronic control unit that includes the memory and the CPU. A well-known PWM inverter that has a plurality of switching elements such as field effect transistors (FETs) is adopted as the drive circuit 42 according to the present embodiment. The motor control signal Sm which is output from the microcomputer 41 determines the on/off state of the switching elements. Consequently, the switching elements are turned on and off in response to the motor control signal Sm to switch the energization pattern of motor coils for respective phases so that direct-current (DC) power of an in-vehicle power source 43 is converted into three-phase drive electric power to be output to the motor 21.

Control blocks to be described below are implemented by a computer program executed by the microcomputer 41.

State amounts are detected in predetermined sampling cycles, and computation processing indicated in the following control blocks is executed in predetermined computation cycles.

The microcomputer 41 receives, as inputs, the vehicle speed SPD, the steering torque Th, and the rotational angle θm of the motor 21. The microcomputer 41 also receives, as inputs, phase current values Iu, Iv, and Iw of the motor 21 detected by current sensors 44 and a power source voltage Vb of the in-vehicle power source 43 detected by a voltage sensor 45. The current sensors 44 are provided in connection lines 46 between the drive circuit 42 and the motor coils for the respective phases. The voltage sensor 45 is provided in a connection line 47 between the in-vehicle power source 43 and the drive circuit 42. In FIG. 2, for convenience of illustration, the current sensors 44 for the respective phases are collectively illustrated as one current sensor 44, and the connection lines 46 for the respective phases are collectively illustrated as one connection line 46. The microcomputer 41 outputs the motor control signal Sm on the basis of such state amounts.

Particularly, the microcomputer 41 includes a current command value computation unit 51 that computes current command values Id* and Iq*, a motor control signal generation unit 52 that outputs the motor control signal Sm on the basis of the current command values Id* and Iq*, and an absolute steering angle detection unit 53 that detects an absolute steering angle θs.

The current command value computation unit 51 receives, as inputs, the vehicle speed SPD, the steering torque Th, the power source voltage Vb, the rotational angle θm, and the absolute steering angle θs. The current command value computation unit 51 computes the current command values Id* and Iq* on the basis of such state amounts. The current command values Id* and Iq* are target values for currents to be supplied to the motor 21, and indicate a current command value on the d-axis and a current command value on the q-axis, respectively, in the d-q coordinate system. Among these, the q-axis current command value Iq* indicates a target value for motor torque output from the motor 21. In the present embodiment, the d-axis current command value Id* is basically fixed at zero. Each of the current command values Id* and Iq* has a positive value when rightward steering is assisted, and a negative value when leftward steering is assisted, for example.

The motor control signal generation unit 52 receives, as inputs, the current command values Id* and Iq*, the phase current values Iu, Iv, and Iw, and the rotational angle θm of the motor 21. The motor control signal generation unit 52 generates the motor control signal Sm by executing current feedback control in the d-q coordinate system on the basis of such state amounts.

Specifically, the motor control signal generation unit 52 computes a d-axis current value Id and a q-axis current value Iq, which are actual current values of the motor 21 in the d-q coordinate system, by mapping the phase current values Iu, Iv, and Iw onto the d-q coordinate on the basis of the rotational angle θm. The motor control signal generation unit 52 generates the motor control signal Sm by performing current feedback control in order to cause the d-axis current value Id to follow the d-axis current command value Id* and cause the q-axis current value Iq to follow the q-axis current command value Iq*.

The motor control signal generation unit 52 outputs the thus generated motor control signal Sm to the drive circuit 42. Consequently, an assist force is applied to the steering mechanism 5 with drive electric power corresponding to the motor control signal Sm supplied to the motor 21 and with motor torque corresponding to the q-axis current command value Iq* output from the motor 21.

The absolute steering angle detection unit 53 receives the rotational angle θm as an input. The absolute steering angle detection unit 53 detects an absolute motor angle, which is represented as an absolute angle in a range including a range exceeding 360°, on the basis of the rotational angle θm. The absolute steering angle detection unit 53 according to the present embodiment integrates the rotational speed (i.e., the number of rotations) of the motor 21 using, as the origin, the rotational angle θm at the time when a start switch such as an ignition switch is turned on for the first time after replacement of the in-vehicle power source 43, for example, and detects the absolute motor angle on the basis of the rotational speed (i.e., the number of rotations) and the rotational angle θm. The absolute steering angle detection unit 53 detects the absolute steering angle θs, which indicates the steering angle of the steering shaft 11, by multiplying the absolute motor angle by a conversion coefficient based on the speed reduction ratio of the speed reduction mechanism 22. In the steering control device 1 according to the present embodiment, whether the motor 21 is rotating is monitored also when the start switch is turned off so that the rotational speed of the motor 21 is integrated (i.e., the number of rotations of the motor 21 are integrated) at all times. Consequently, the origin of the absolute steering angle θs at the time when the start switch is turned on for the second time or later after replacement of the in-vehicle power source 43 is the same as the origin set when the start switch is turned on for the first time.

Since the steered angle of the steered wheels 4 is changed in accordance with rotation of the steering shaft 11 as described above, the absolute steering angle θs indicates the rotational angle of a rotary shaft that is convertible into the steered angle of the steered wheels 4. Each of the absolute motor angle and the absolute steering angle θs has a positive value in the case of an angle of rotation to the right from the origin, and a negative value in the case of an angle of rotation to the left from the origin, for example.

Next, the configuration of the current command value computation unit 51 will be described. The current command value computation unit 51 includes an assist command value computation unit 61 that computes an assist command value Ias* which is a fundamental component of the q-axis current command value Iq*. The current command value computation unit 51 also includes a limit value setting unit 62 that sets a limit value Ig as an upper limit of the absolute value of the q-axis current command value Iq*, and an upper limit guard processing unit 63 that limits the absolute value of the assist command value Ias* to the limit value Ig or less. A memory 64 is connected to the limit value setting unit 62. The current command value computation unit 51 also includes an end position corresponding angle management unit 65 that manages end position corresponding angles θs_le and θs_re stored in the memory 64.

The assist command value computation unit 61 receives the steering torque Th and the vehicle speed SPD as inputs. The assist command value computation unit 61 computes the assist command value Ias* on the basis of the steering torque Th and the vehicle speed SPD. Specifically, the assist command value computation unit 61 computes the assist command value Ias* which has an absolute value that increases as the absolute value of the steering torque Th increases and as the vehicle speed SPD decreases. The thus computed assist command value Ias* is output to the upper limit guard processing unit 63.

The upper limit guard processing unit 63 receives the limit value Ig, which is set by the limit value setting unit 62 as discussed later, as an input in addition to the assist command value Ias*. In the case where the absolute value of the input assist command value Ias* is equal to or smaller than the limit value Ig, the upper limit guard processing unit 63 outputs the assist command value Ias* without changing it, to the motor control signal generation unit 52, as the q-axis current command value Iq*. In the case where the absolute value of the input assist command value Ias* is larger than the limit value Ig, on the other hand, the upper limit guard processing unit 63 outputs a value obtained by limiting the absolute value of the assist command value Ias* to the limit value Ig to the motor control signal generation unit 52, as the q-axis current command value Iq*.

The memory 64 stores a rated current Ir as a maximum current corresponding to torque set in advance as motor torque that can be output from the motor 21, the end position corresponding angles θs_le and θs_re, etc. The left end position corresponding angle θs_le is the absolute steering angle θs corresponding to the left rack end position. The right end position corresponding angle θs_re is the absolute steering angle θs corresponding to the right rack end position. The end position corresponding angles θs_le and θs_re are set in advance through appropriate learning performed on the basis of steering by the driver, for example.

Next, the configuration of the limit value setting unit 62 will be described. The limit value setting unit 62 receives, as inputs, a motor angular velocity cpm obtained by differentiating the rotational angle θm, the absolute steering angle θs, the vehicle speed SPD, the steering torque Th, the power source voltage Vb, the rated current Ir, and the end position corresponding angles θs_le and θs_re. The limit value setting unit 62 sets the limit value Ig on the basis of such state amounts.

Figure 3:
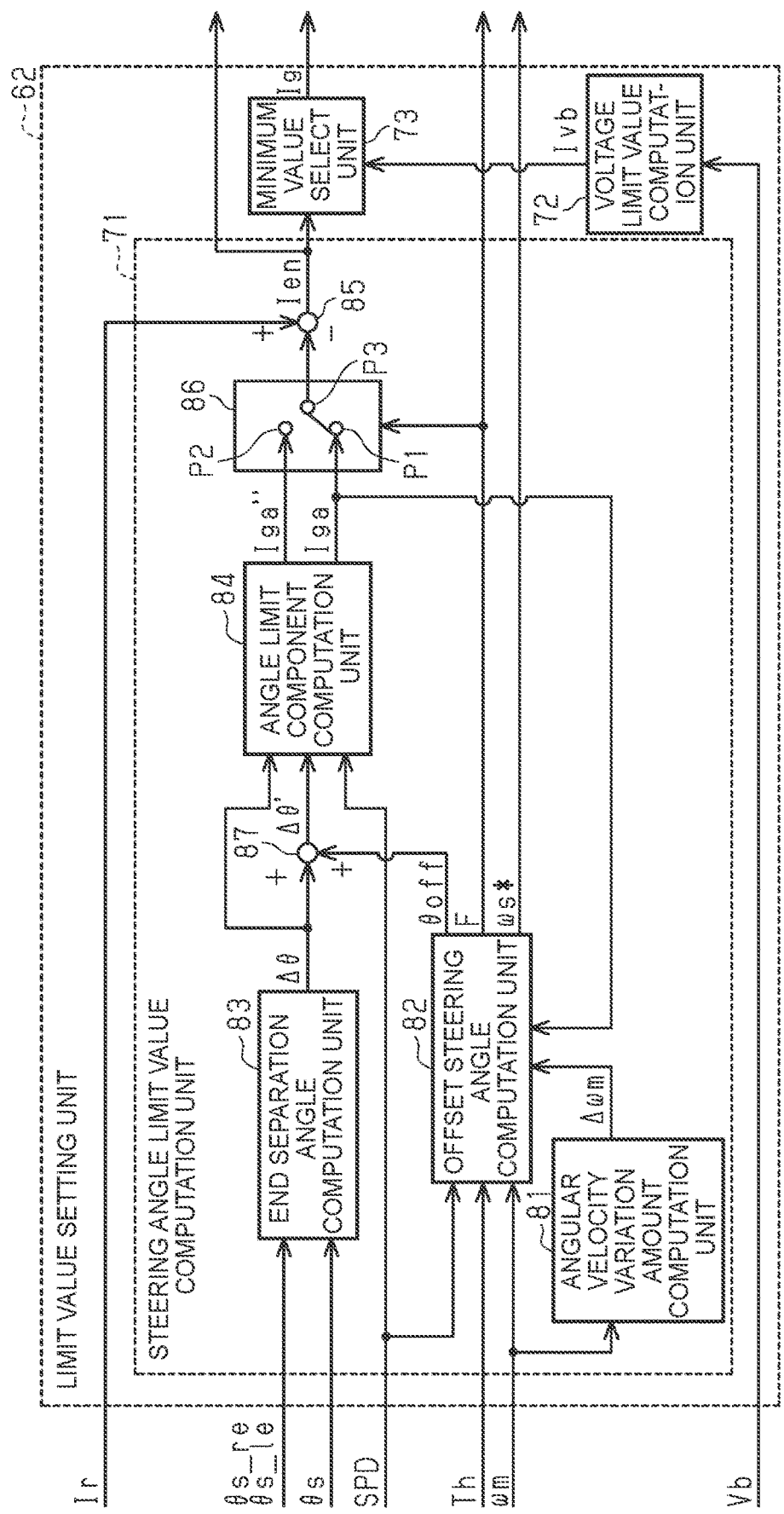
FIG. 3 is a block diagram of a limit value setting unit.

Particularly, as illustrated in FIG. 3, the limit value setting unit 62 includes a steering angle limit value computation unit 71 that computes a steering angle limit value Ten based on the absolute steering angle θs; a voltage limit value computation unit 72 that computes a voltage limit value Ivb as a different limit value based on the power source voltage Vb; and a minimum value select unit 73 that selects the smaller one of the steering angle limit value Ten and the voltage limit value Ivb.

The steering angle limit value computation unit 71 receives, as inputs, the motor angular velocity cpm, the absolute steering angle θs, the vehicle speed SPD, the steering torque Th, the rated current Ir, and the end position corresponding angles θs_le and θs_re. The steering angle limit value computation unit 71 computes the steering angle limit value Ten on the basis of such state amounts. The steering angle limit value Ien decreases on the basis of a decrease in an end separation angle Δθ, which indicates the separation of the absolute steering angle θs from the end position corresponding angle θs_le or θs_re, in the case where the end separation angle Δθ is equal to or smaller than a predetermined angle θa as discussed later. The thus computed steering angle limit value Ten is output to the minimum value select unit 73.

The voltage limit value computation unit 72 receives the power source voltage Vb as an input. The voltage limit value computation unit 72 computes the voltage limit value Ivb which is smaller than a rated voltage for supplying the rated current Ir in the case where the absolute value of the power source voltage Vb is equal to or smaller than a voltage threshold Vth set in advance. Specifically, the voltage limit value computation unit 72 computes the voltage limit value Ivb which has an absolute value that decreases on the basis of a decrease in the absolute value of the power source voltage Vb in the case where the absolute value of the power source voltage Vb is equal to or smaller than the voltage threshold Vth. The thus computed voltage limit value Ivb is output to the minimum value select unit 73.

The minimum value select unit 73 selects, as the limit value Ig, the smaller one of the steering angle limit value Ten and the voltage limit value Ivb which are input, and outputs the selected one to the upper limit guard processing unit 63. When the steering angle limit value Ten is output to the upper limit guard processing unit 63 as the limit value Ig, the absolute value of the q-axis current command value Iq* is limited to the steering angle limit value Ten. Consequently, end strike relaxation control in which the impact of an end strike is relaxed (i.e., reduced) is executed by reducing the absolute value of the q-axis current command value Iq* on the basis of a decrease in the end separation angle Δθ in the case where the end separation angle Δθ is equal to or smaller than the predetermined angle θa. That is, the current command value computation unit 51 according to the present embodiment corrects the q-axis current command value Iq* by limiting the absolute value of the q-axis current command value Iq* to the limit value Ig or less. The correction amount for the q-axis current command value Iq* corresponds to an amount by which the assist command value Ias* exceeds the limit value Ig, that is, an amount by which the assist command value Ias* exceeds the steering angle limit value Ten.

When the voltage limit value Ivb is output to the upper limit guard processing unit 63 as the limit value Ig, the absolute value of the q-axis current command value Iq* is limited to the voltage limit value Ivb. Consequently, power source protection control in which the absolute value of the q-axis current command value Iq* is reduced on the basis of a reduction in the absolute value of the power source voltage Vb is executed in the case where the absolute value of the power source voltage Vb is equal to or smaller than the voltage threshold Vth.

Movement of the rack shaft 12 may be restricted at a virtual rack end position, which is closer to the neutral steering position than the actual rack end position at which the rack shaft 12 actually contacts the rack housing 13, through execution of the end strike relaxation control. In this case, the absolute steering angle θs is smaller than that in the case where the rack shaft 12 is at the actual rack end position. This may lower the vehicle performance in making sharp turns.

Thus, the current command value computation unit 51 according to the present embodiment executes partial release control for reducing the correction amount for the q-axis current command value Iq* determined through execution of the end strike relaxation control, on the basis of the steering torque Th which is input to the EPS 2, in the case where the driver attempts to turn the vehicle during execution of the end strike relaxation control. As described above, the upper limit guard processing unit 63 limits the absolute value of the q-axis current command value Iq* to the limit value Ig or less, and thus the correction amount for the q-axis current command value Iq* decreases as the steering angle limit value Ten as the limit value Ig increases. In the present embodiment, in view of this respect, the partial release control is executed by the steering angle limit value computation unit 71 computing the steering angle limit value Ten which is larger than the steering angle limit value Ten computed while the partial release control is not executed, in the case where the driver attempts to turn the vehicle during execution of the end strike relaxation control, as described below.

Particularly, the steering angle limit value computation unit 71 includes an angular velocity variation amount computation unit 81 that computes an angular velocity variation amount Δωm; an offset steering angle computation unit 82 that computes an offset steering angle θoff; and an end separation angle computation unit 83 that computes the end separation angle Δθ. The steering angle limit value computation unit 71 also includes an angle limit component computation unit 84 that computes a normal-time angle limit component Iga based on the end separation angle Δθ and a release-time angle limit component Iga" based on a release-time end separation angle Δθ ' obtained by adding the offset steering angle θoff to the end separation angle Δθ. The steering angle limit value computation unit 71 further includes an output switching unit 86 that selects one of the angle limit components Iga and Iga" and outputs the selected one to a subtractor 85, and computes the steering angle limit value Ten by subtracting one of the angle limit components Iga and Iga" from the rated current Ir. The control blocks will be sequentially described below.

Angular Velocity Variation Amount Computation Unit 81

The angular velocity variation amount computation unit 81 receives the motor angular velocity ωm as an input. The angular velocity variation amount computation unit 81 computes, on the basis of the input motor angular velocity ωm, the angular velocity variation amount Δωm which is the variation amount of the motor angular velocity ωm. The angular velocity variation amount computation unit 81 outputs the angular velocity variation amount Δωm to the offset steering angle computation unit 82. The angular velocity variation amount computation unit 81 according to the present embodiment outputs the angular velocity variation amount Δωm which has been subjected to a low-pass filter process, to the offset steering angle computation unit 82.

Offset Steering Angle Computation Unit 82

The offset steering angle computation unit 82 receives, as inputs, the vehicle speed SPD, the steering torque Th, the motor angular velocity cpm, the angular velocity variation amount Δωm, and the normal-time angle limit component Iga to be discussed later. The offset steering angle computation unit 82 makes a turn intention determination, as to whether the driver attempts to turn the vehicle by performing an operation of turning the steering wheel 3 or an operation of keeping the steering wheel 3 stationary during execution of the end strike relaxation control, on the basis of such state amounts. In the case where it is determined that the driver attempts to turn the vehicle during execution of the end strike relaxation control, the offset steering angle computation unit 82 starts computation of the offset steering angle θoff, and outputs the offset steering angle θoff to an adder 87. In the case where it is not determined that the driver attempts to turn the vehicle during execution of the end strike relaxation control (i.e., it is determined that the driver does not attempt to turn the vehicle during execution of the end strike relaxation control), the offset steering angle computation unit 82 does not compute the offset steering angle θoff.

The offset steering angle computation unit 82 outputs a release flag F, which indicates whether the partial release control is being executed, to the output switching unit 86 and the end position corresponding angle management unit 65. The release flag F indicates that the partial release control is not being executed in the case where the value of the flag is "0", and indicates that the partial release control is being executed in the case where the value of the flag is "1". The offset steering angle computation unit 82 sets the value of the release flag F to "0" before computation of the offset steering angle θoff is started, and sets the value of the release flag F to "1" after computation of the offset steering angle θoff is started.

Next, a method of computing the offset steering angle θoff will be described in detail. The offset steering angle computation unit 82 computes the offset steering angle θoff, which is based on the steering torque Th, using the following model formula (1).

$$|Th|=J\times\ddot{\theta}s^*+C\times\dot{\theta}s^*+K1\times\theta s^* \quad (1)$$

In the following, for convenience of description, a target steering speed which is a first-order time differential value of "θs*" is also denoted by "ωs*". This model formula defines and represents the relationship between the steering torque Th, which is input via the steering wheel 3, and the rotational angle of a rotary shaft that is convertible into the steered angle of the steered wheels 4. This model formula is represented using an elastic modulus K1 which models the specifications of the suspensions, wheel alignment, etc. of the vehicle on which the EPS 2 is mounted, a viscosity coefficient C which models friction etc. of the EPS 2, and an inertia coefficient J which models the inertia of the EPS 2.

The offset steering angle computation unit 82 according to the present embodiment computes the target steering speed ωs* using the following formula (2) which is organized for the target steering speed ωs*, by setting the elastic modulus K1 and the inertia coefficient J to zero, in consideration of the reduction in the computation load and the steering feeling to be achieved.

$$\dot{\theta}s*=\frac{|Tb|}{C} \quad (2)$$

The offset steering angle computation unit 82 sets a value obtained by integrating the target steering speed ωs*, as the offset steering angle θoff. The thus computed offset steering angle θoff is output to the adder 87. The target steering speed ωs*, which is obtained in the course of computing the offset steering angle θoff, is output to the end position corresponding angle management unit 65.

Next, the turn intention determination will be described in detail. The offset steering angle computation unit 82 determines that the driver attempts to turn the vehicle during execution of the end strike relaxation control in the case where the following conditions (A1) to (A5) for the turn intention determination are met continuously for a first predetermined time. The first predetermined time is set to an appropriate time that enables determining that the driver is performing the operation of turning the steering wheel 3 or the operation of keeping the steering wheel 3 stationary.

(A1) The normal-time angle limit component Iga is larger than a first current threshold Ith1. (A2) The absolute value of the steering torque Th is equal to or larger than a first steering torque threshold Tth1. (A3) The vehicle speed SPD is within a predetermined vehicle speed range.

(A4) The absolute value of the motor angular velocity ωm is equal to or smaller than a stop angular velocity threshold ωth_st. (A5) The absolute value of the angular velocity variation amount Δωm, which is the variation amount of the motor angular velocity ωm, is smaller than a stop angular velocity variation amount threshold Δωth_st.

The first current threshold Ith1 is set such that a predetermined assist force, which is a minimum assist force that can move the rack shaft 12 to a rack end position, is applied from the motor 21 in the case where the value of the angle limit component Iga is the first current threshold Ith1 and the vehicle is traveling at a low speed on a normal road surface. In other words, the absolute value of the steering angle limit value Ten which is obtained by subtracting the first current threshold Ith1 from the rated current Ir is determined such that the predetermined assist force is output from the motor 21 when a current having the absolute value is supplied to the motor 21. The first current threshold Ith1 is a current value based on the rated current Ir, and is set to 50% of the rated current Ir, for example.

The first steering torque threshold Tth1 corresponds to steering torque required to keep the steering wheel 3 stationary when the vehicle makes a turn with the rack end 18 contacting the rack housing 13, and is set to an appropriate value that is larger than zero. The predetermined vehicle speed range indicates a vehicle speed range that is equal to or higher than a lower limit vehicle speed Slo, which indicates that the vehicle is in a non-stationary state, and less than an upper limit vehicle speed Sup, which indicates that the vehicle is traveling at a low speed. The lower limit vehicle speed Slo is set to a value that is slightly larger than zero. The upper limit vehicle speed Sup is set to an appropriate value that is larger than the lower limit vehicle speed Slo. The stop angular velocity threshold ωth_st corresponds to an angular velocity indicating that the motor 21 is stopped, and is set to a value that is slightly larger than zero. The stop angular velocity variation amount threshold Δωth_st corresponds to an angular velocity variation amount indicating that the motor 21 is substantially not accelerating or decelerating, and is set to a value that is slightly larger than zero.

The offset steering angle computation unit 82 stops computation of the offset steering angle θoff when the normal-time angle limit component Iga becomes smaller than the first current threshold Ith1 due to the driver performing an operation of returning the steering wheel 3, for example, while computing the offset steering angle θoff, that is, during execution of the partial release control. That is, the partial release control is stopped.

Figure 4:
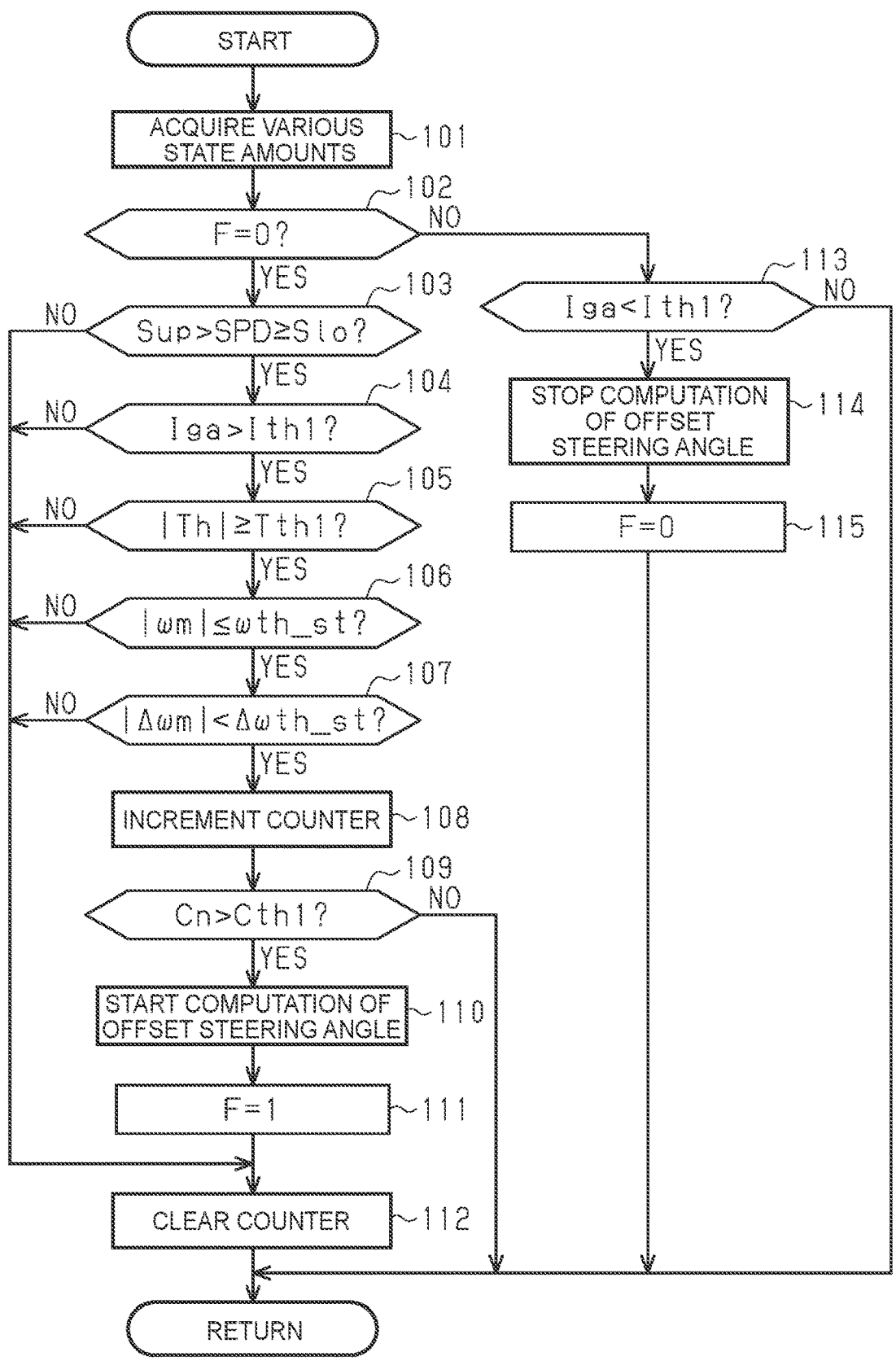
FIG. 4 is a flowchart illustrating the process procedure for computation of an offset steering angle performed by an offset steering angle computation unit.

Next, the process procedure for computation of the offset steering angle θoff performed by the offset steering angle computation unit 82 will be described. As illustrated in the flowchart in FIG. 4, when the various state amounts are acquired (step 101), the offset steering angle computation unit 82 determines whether the release flag F is "0", that is, whether the partial release control is being unexecuted (step 102).

In the case where the release flag F is set to "0" (step 102: YES), the offset steering angle computation unit 82 determines whether the vehicle speed SPD is equal to or larger than the lower limit vehicle speed Slo and less than the upper limit vehicle speed Sup (step 103). In the case where the vehicle speed SPD is equal to or larger than the lower limit vehicle speed Slo and less than the upper limit vehicle speed Sup to be within a predetermined vehicle speed range (step 103: YES), it is determined whether the angle limit component Iga is larger than the first current threshold Ith1 (step 104). In the case where the angle limit component Iga is larger than the first current threshold Ith1 (step 104: YES), it is determined whether the absolute value of the steering torque Th is equal to or larger than the first steering torque threshold Tth1 (step 105). In the case where the absolute value of the steering torque Th is equal to or larger than the first steering torque threshold Tth1 (step 105: YES), it is determined whether the absolute value of the motor angular velocity ωm is equal to or smaller than the stop angular velocity threshold ωth_st (step 106). In the case where the absolute value of the motor angular velocity ωm is equal to or smaller than the stop angular velocity threshold ωth_st (step 106: YES), it is determined whether the absolute value of the angular velocity variation amount Δωm is smaller than the stop angular velocity variation amount threshold Δωth_st (step 107). In the case where the absolute value of the angular velocity variation amount Δωm is smaller than the stop angular velocity variation amount threshold Δωth_st (step 107: YES), the process proceeds to step 108.

In step 108, the offset steering angle computation unit 82 increments a count value Cn of a turn counter indicating the time which has elapsed since the determinations in steps 103 to 107 are made, that is, the conditions (A1) to (A5) are met. Subsequently, it is determined whether the count value Cn is larger than a predetermined count value Cth1 corresponding to a first predetermined time (step 109). In the case where the count value Cn is larger than the predetermined count value Cth1 (step 109: YES), computation of the offset steering angle θoff is started (step 110), the value of the release flag F is set to "1" which indicates that the partial release control is being executed, and the count value Cn of the turn counter is cleared (steps 111 and 112).

In the case where the count value Cn is equal to or smaller than the predetermined count value Cth1 (step 109: NO), the offset steering angle computation unit 82 does not execute any further processes. In the case where any one of the conditions in steps 103 to 107 is not met (steps 103 to 107: NO), the processes in steps 108 to 111 are not executed, and the process proceeds to step 112 to clear the count value Cn.

In the case where the value of the release flag F is set to "1" (step 102: NO), the offset steering angle computation unit 82 determines whether the angle limit component Iga which is computed on the basis of the end separation angle Δθ is smaller than the first current threshold Ith1 (step 113). In the case where the angle limit component Iga is smaller than the first current threshold Ith1 (step 113: YES), computation of the offset steering angle θoff is stopped (step 114), and the value of the release flag F is set to "0" which indicates that the partial release control is stopped (step 115). In the case where the angle limit component Iga is equal to or larger than the first current threshold Ith1 (step 113: NO), no further processes are not executed.

End Separation Angle Computation Unit 83

As illustrated in FIG. 3, the end separation angle computation unit 83 receives, as inputs, the absolute steering angle θs and the end position corresponding angles θs_le and θs_re. The end separation angle computation unit 83 computes the difference between the absolute steering angle θs and the left end position corresponding angle θs_le in the last computation cycle and the difference between the absolute steering angle θs and the right end position corresponding angle θs_re in the last computation cycle. The end separation angle computation unit 83 outputs one of the computed differences, the absolute value of which is the smaller, to the angle limit component computation unit 84 and the adder 87, as the end separation angle Δθ.

Angle Limit Component Computation Unit 84

The angle limit component computation unit 84 receives the end separation angle Δθ and the vehicle speed SPD as inputs. The angle limit component computation unit 84 also receives the release-time end separation angle Δθ ' which is obtained by adding the offset steering angle θoff to the end separation angle Δθ in the adder 87. The release-time end separation angle Δθ ' has a value that is larger than the end separation angle Δθ by the value of the offset steering angle θoff. The angle limit component computation unit 84 computes the angle limit components Iga and Iga″ on the basis of such state amounts.

Figure 5:
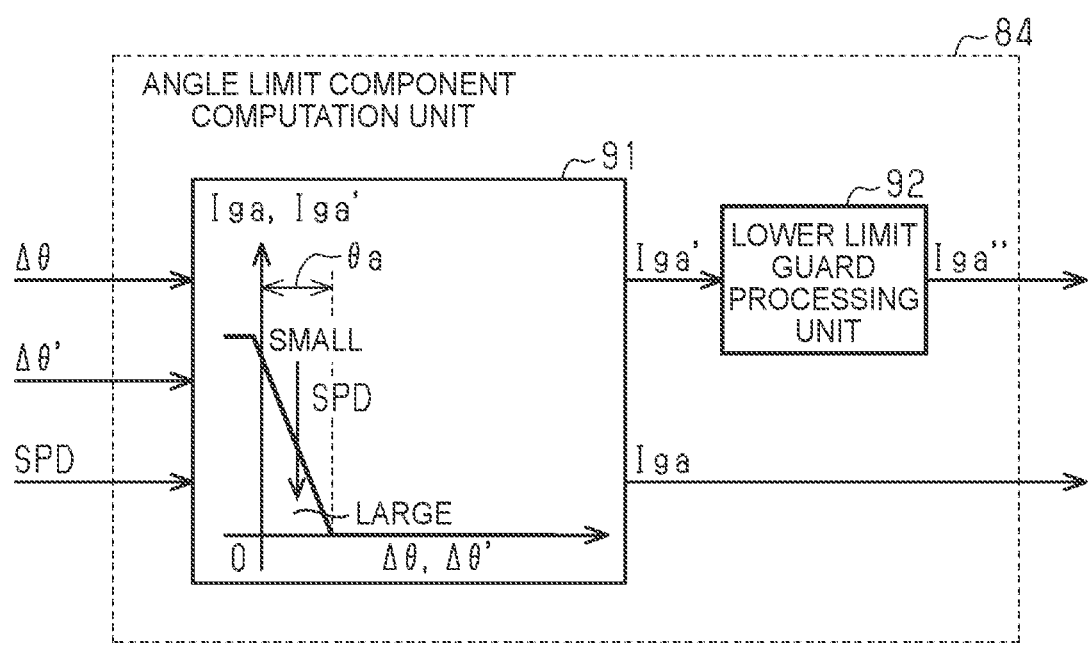
FIG. 5 is a block diagram of an angle limit component computation unit.

Particularly, as illustrated in FIG. 5, the angle limit component computation unit 84 includes a map computation unit 91 that computes the normal-time angle limit component Iga and the release-time angle limit component Iga′ and a lower limit guard processing unit 92 that determines the lower limit value of the absolute value of the release-time angle limit component Iga′.

The map computation unit 91 includes a normal-time map that defines the relationship among the end separation angle Δθ, the vehicle speed SPD, and the normal-time angle limit component Iga, and computes the angle limit component Iga which corresponds to the end separation angle Δθ and the vehicle speed SPD by referring to the map. The thus computed normal-time angle limit component Iga is output to the offset steering angle computation unit 82 and the output switching unit 86.

In the normal-time map, the angle limit component Iga is set to be decreased in proportion as the end separation angle Δθ increases from zero, and to be zero when the end separation angle Δθ is larger than the predetermined angle θa. In addition, the normal-time map also has a region in which the end separation angle Δθ is negative, and the angle limit component Iga is increased in proportion as the end separation angle Δθ decreases when the end separation angle Δθ is smaller than zero, and the angle limit component Iga is constant after reaching the same value as the rated current Ir. The region of the map in which the end separation angle Δθ is negative is set on the assumption that the motor 21 is rotated with the EPS 2 elastically deformed by further turning the steering wheel 3 in a state in which the rack end 18 contacts the rack housing 13. The predetermined angle θa is set to a small angle that indicates a range in the vicinity of each of the end position corresponding angles θs_le and θs_re. That is, the angle limit component Iga is set to decrease as the absolute steering angle θs is varied from each of the end position corresponding angles θs_le and θs_re toward the neutral steering position, and to zero in the case where the absolute steering angle θs is closer to the neutral steering position than the vicinity of each of the end position corresponding angles θs_le and θs_re.

In the normal-time map, in addition, the angle limit component Iga is set to decrease on the basis of an increase in the vehicle speed SPD in a region in which the end separation angle Δθ is equal to or smaller than the predetermined angle θa. Specifically, the angle limit component Iga is set to be larger than zero in the case where the vehicle speed SPD is in a low speed range, and the angle limit component Iga is set to zero in the case where the vehicle speed SPD is in a middle to high speed range.

The map computation unit 91 also includes a release-time map that defines the relationship among the release-time end separation angle Δθ ′, the vehicle speed SPD, and the release-time angle limit component Iga′, and computes the angle limit component Iga′ which corresponds to the release-time end separation angle Δθ ′ and the vehicle speed SPD by referring to the map. The thus computed release-time angle limit component Iga′ is output to the lower limit guard processing unit 92.

The release-time map is set to be the same map as the normal-time map. That is, the angle limit component Iga and the angle limit component Iga′ to be computed are equal to each other in the case where the vehicle speed SPD is the same and the end separation angle Δθ and the end separation angle Δθ ′ are equal to each other. As described above, the release-time end separation angle Δθ ′ has a value that is larger than the end separation angle Δθ by the value of the offset steering angle θoff. Therefore, the map computation unit 91 computes the release-time angle limit component Iga′ which is smaller than the normal-time angle limit component Iga by an amount corresponding to the offset steering angle θoff.

The lower limit guard processing unit 92 adjusts the release-time angle limit component Iga′ such that the steering angle limit value Ten is not equal to or larger than a limit threshold Ith_lim set in advance, during execution of the partial release control. The limit threshold Ith_lim is set such that the predetermined assist force is applied from the motor 21 when a current at the limit threshold Ith_lim is supplied to the motor 21. In the present embodiment, the limit threshold Ith_lim is set to the same value as the first current threshold Ith1. The lower limit guard processing unit 92 adjusts the angle limit component Iga′ on the basis of the result of a magnitude comparison between the angle limit component Iga′ and the first current threshold Ith1.

Particularly, the lower limit guard processing unit 92 outputs the value of the angle limit component Iga′ without changing it, to the output switching unit 86, as the angle limit component Iga″ in the case where the absolute value of the input release-time angle limit component Iga′ is equal to or larger than the first current threshold Ith1 which is set in advance. On the other hand, the lower limit guard processing unit 92 outputs a value obtained by changing the absolute value of the angle limit component Iga′ to the value of the first current threshold Ith1, to the output switching unit 86, as the angle limit component Iga″ in the case where the absolute value of the input release-time angle limit component Iga′ is smaller than the first current threshold Ith1.

Consequently, the angle limit component Iga″ which is output to the output switching unit 86 is equal to or larger than the first current threshold Ith1. Therefore, the steering angle limit value Ten is not equal to or larger than the limit threshold Ith_lim in the case where the angle limit component Iga″ is subtracted from the rated current Ir, that is, during execution of the partial release control.

Output Switching Unit 86

As illustrated in FIG. 3, the output switching unit 86 receives the angle limit components Iga and Iga″ and the release flag F as inputs. The output switching unit 86 has a contact point P1 to which the normal-time angle limit component Iga is input, a contact point P2 to which the release-time angle limit component Iga″ is input, and a contact point P3 connected to the subtractor 85. In the case where the release flag F is set to "0", the output switching unit 86 connects the contact point P1 and the contact point P3, and outputs the normal-time angle limit component Iga to the subtractor 85. In the case where the release flag F is set to "1", the output switching unit 86 connects the contact point P2 and the contact point P3, and outputs the release-time angle limit component Iga″ to the subtractor 85.

The subtractor 85 outputs, to the minimum value select unit 73, a value obtained by subtracting the normal-time angle limit component Iga or the release-time angle limit component Iga″ from the rated current Ir, as the steering angle limit value Ten, depending on whether the partial release control is being executed.

Next, the configuration of the end position corresponding angle management unit 65 will be described. As illustrated in FIG. 2, the end position corresponding angle management unit 65 receives, as inputs, the vehicle speed SPD, the steering torque Th, the q-axis current value Iq, the q-axis current command value Iq*, the steering angle limit value Ten, the absolute steering angle θs, the release flag F, the target steering speed ωs*, and the motor angular velocity cpm which is obtained by differentiating the rotational angle θm. The end position corresponding angle management unit 65 manages update of the end position corresponding angles θs_le and θs_re, which are stored in the memory 64, on the basis of such state amounts.

The end position corresponding angle management unit 65 determines whether movement of the rack shaft 12 to one of the right and left sides is restricted, and acquires a plurality of absolute steering angles θs at the time when it is determined that movement of the rack shaft 12 is restricted, as restriction position determination angles θi (i is a natural number). The end position corresponding angle management unit 65 determines on the basis of the plurality of restriction position determination angles θi whether or not it is necessary to update the end position corresponding angle θs_le or θs_re which is stored in the memory 64, and updates the end position corresponding angle θs_le or θs_re in the case where it is necessary to update the end position corresponding angle θs_le or θs_re.

Figure 6:
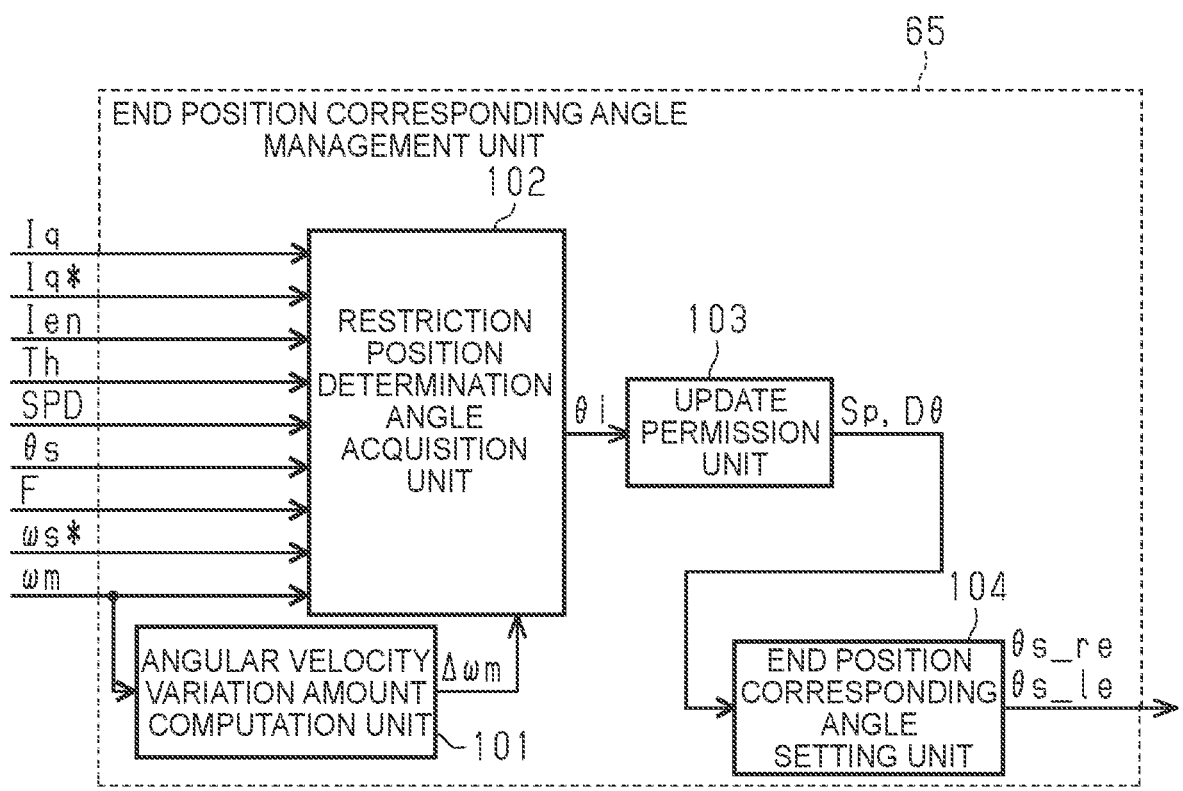
FIG. 6 is a block diagram of an end position corresponding angle management unit.

Particularly, as illustrated in FIG. 6, the end position corresponding angle management unit 65 includes an angular velocity variation amount computation unit 101, a restriction position determination angle acquisition unit 102, an update permission unit 103, and an end position corresponding angle setting unit 104. The angular velocity variation amount computation unit 101 computes the angular velocity variation amount Δωm which has been subjected to a low-pass filter process and outputs the angular velocity variation amount Δωm to the restriction position determination angle acquisition unit 102, as in the case of the angular velocity variation amount computation unit 81. The control blocks will be sequentially described below.

Restriction Position Determination Angle Acquisition Unit 102

The restriction position determination angle acquisition unit 102 receives, as inputs, the q-axis current value Iq, the q-axis current command value Iq*, the steering angle limit value Ten, the vehicle speed SPD, the steering torque Th, the absolute steering angle θs, the release flag F, the target steering speed ωs*, the motor angular velocity cpm, and the angular velocity variation amount Δωm. The restriction position determination angle acquisition unit 102 determines on the basis of such state amounts whether movement of the rack shaft 12 to one of the right and left sides is restricted, and acquires the restriction position determination angle θi corresponding to the absolute steering angle θs at the time when it is determined that movement of the rack shaft 12 is restricted.

The restriction position determination angle acquisition unit 102 makes a determination as to whether movement of the rack shaft 12 is restricted and acquires the restriction position determination angle θi separately for the release time when the partial release control is being executed and the normal time when the partial release control is not being executed.

Figure 7:
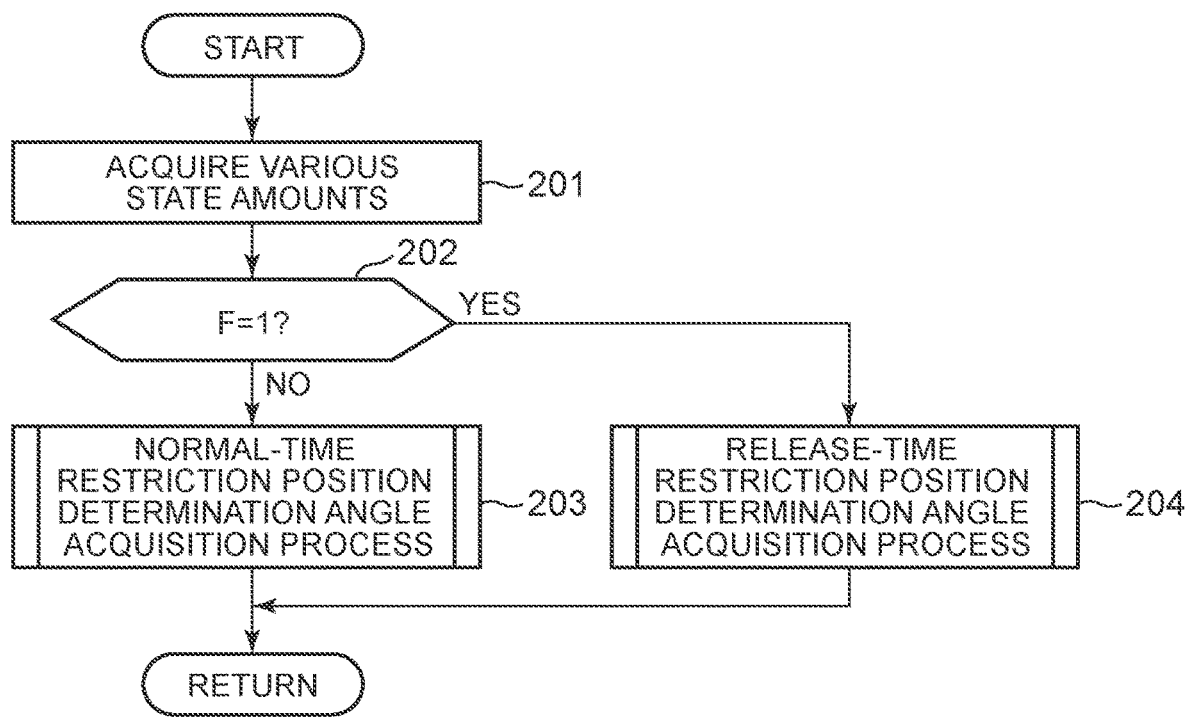
FIG. 7 is a flowchart illustrating the process procedure for acquisition of a restriction position determination angle performed by a restriction position determination angle acquisition unit.

Specifically, as illustrated in the flowchart in FIG. 7, when the various state amounts are acquired (step 201), the restriction position determination angle acquisition unit 102 determines whether the release flag F is set to "1" (step 202). In the case where the release flag F is set to "0" (step 202: NO), a normal-time restriction position determination angle acquisition process for acquiring the restriction position determination angle θi during normal times is executed (step 203). In the case where the release flag F is set to "1" (step 202: YES), a release-time restriction position determination angle acquisition process for acquiring the restriction position determination angle θi during release times is executed (step 204). In the normal-time restriction position determination angle acquisition process, a dynamic restriction determination and a static restriction determination are performed to determine whether movement of the steered shaft is restricted when the partial release control is not being executed. That is, the dynamic restriction determination and the static restriction determination each correspond to a normal-time end strike determination. In the release-time restriction position determination angle acquisition process, a non-following determination and an additional restriction determination are performed to determine whether movement of the rack shaft 12 is restricted when the partial release control is being executed. That is, the restriction position determination angle acquisition unit 102 corresponds to a normal-time restriction position determination angle acquisition unit and a release-time restriction position determination angle acquisition unit. Such processes will be discussed in detail later.

The restriction position determination angle acquisition unit 102 acquires a value obtained by subtracting mechanical elastic deformation caused in the EPS 2 from the absolute steering angle θs acquired (detected) at the time when it is determined that movement of the rack shaft 12 is restricted, as the restriction position determination angle θi in each of the normal-time restriction position determination angle acquisition process and the release-time restriction position determination angle acquisition process. That is, the restriction position determination angle acquisition unit 102 performs rigidity compensation in which the absolute steering angle θs acquired at the time when it is determined that movement of the rack shaft 12 is restricted is corrected on the basis of mechanical elastic deformation of the EPS 2 caused by torque applied to the EPS 2, and acquires the angle after the rigidity compensation as the restriction position determination angle θi.

Particularly, the restriction position determination angle acquisition unit 102 computes pinion shaft torque Tp, which is the total value of torque applied to the EPS 2 when it is determined that movement of the rack shaft 12 is restricted. The pinion shaft torque Tp corresponds to an axial force that acts on the rack shaft 12. The restriction position determination angle acquisition unit 102 according to the present embodiment computes the pinion shaft torque Tp using the steering torque Th which is applied by the driver, motor torque based on the q-axis current value Iq, and inertial torque based on the angular velocity variation amount Δωm of the motor 21 as indicated by the following formula (3).

$$Tp = Th + Iq \times K2 + \Delta\omega m \times K3 \qquad (3)$$

"K2" indicates a coefficient determined in accordance with the motor constant of the motor 21, the speed reduction ratio and the efficiency of the speed reduction mechanism 22, etc. "K3" indicates a coefficient determined in accordance with the inertial moment of the motor 21, the speed reduction ratio and the efficiency of the speed reduction mechanism 22, etc.

Figure 8:
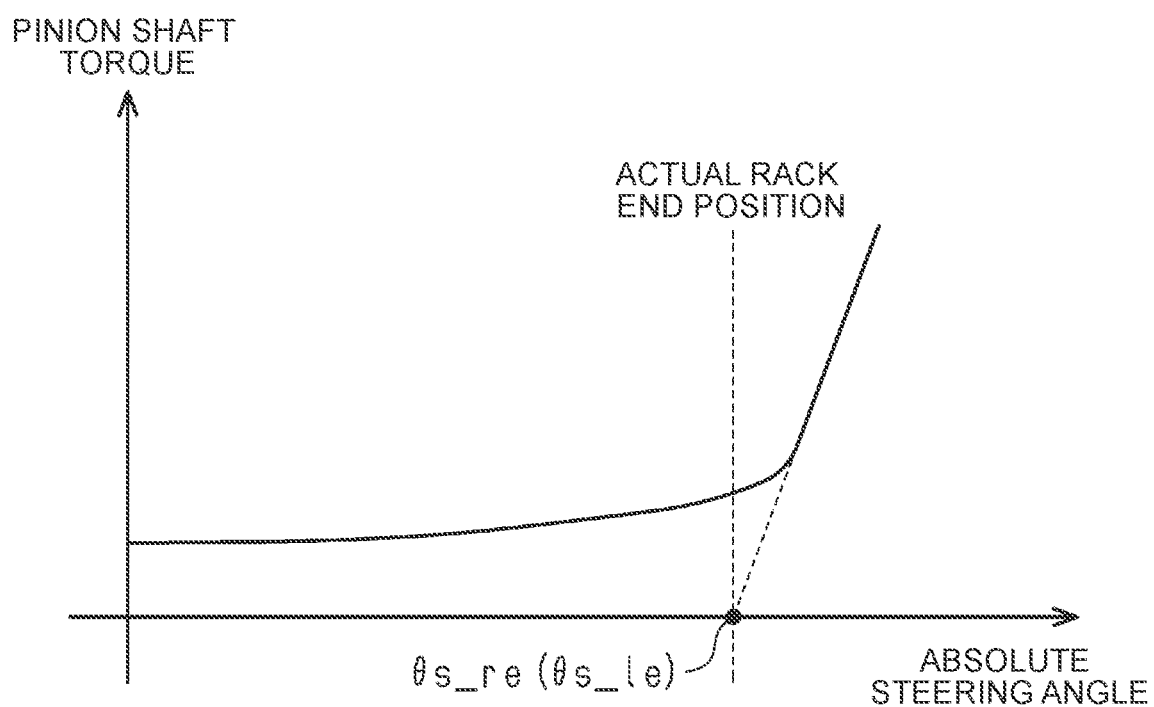
FIG. 8 is a schematic chart indicating the relationship between an absolute steering angle and pinion shaft torque.

Normally, as indicated in FIG. 8, when a steering operation is performed by the driver, the absolute steering angle θs is increased with the steered wheels 4 steered in accordance with the pinion shaft torque Tp which is applied to the EPS 2. The absolute steering angle θs is not increased significantly, even if the pinion shaft torque Tp is increased, after the absolute steering angle θs slightly exceeds an angle corresponding to the actual rack end position. This is because movement of the rack shaft 12 is restricted by an end strike and, therefore, an increase in the pinion shaft torque Tp results in only slight rotation of the motor 21 due to mechanical elastic deformation such as twist of the steering shaft 11 which constitutes the EPS 2 and compression of the rack shaft 12. The gradient of the pinion shaft torque Tp with respect to the absolute steering angle θs is proportional to an elastic modulus K4 of the EPS 2. Thus, the absolute steering angle θs at a position at which the pinion shaft torque Tp is zero on the gradient with respect to the absolute steering angle θs substantially coincides with the actual rack end position.

In view of the above, the restriction position determination angle acquisition unit 102 computes the rotational angle of the motor 21, which is based on the amount of elastic deformation of the EPS 2, by multiplying the pinion shaft torque Tp by the elastic modulus K4 of the EPS 2. The restriction position determination angle acquisition unit 102 acquires, as the restriction position determination angle θi, a value obtained by subtracting the rotational angle described above from the absolute steering angle θs acquired at the time when it is determined that movement of the rack shaft 12 is restricted.

Normal-Time Restriction Position Determination Angle Acquisition Process

Next, the normal-time restriction position determination angle acquisition process will be described. In the normal-time restriction position determination angle acquisition process, the restriction position determination angle acquisition unit 102 makes a dynamic restriction determination and a static restriction determination, and acquires the restriction position determination angle θi which is a normal-time restriction position determination angle. Specifically, the restriction position determination angle acquisition unit 102 acquires, as the restriction position determination angle θi, an angle obtained by performing rigidity compensation on the absolute steering angle θs acquired at the time when the dynamic restriction determination is established continuously for a second predetermined time, or the absolute steering angle θs acquired at the time when the static restriction determination is established continuously for a third predetermined time. The restriction position determination angle acquisition unit 102 according to the present embodiment first makes the dynamic restriction determination, and makes the static restriction determination in the case where the dynamic restriction determination is not established.

The static restriction determination is performed to detect a state in which the operation of keeping the steering wheel 3 stationary is performed with movement of the rack shaft 12 kept restricted and a state in which the operation of turning the steering wheel 3 is performed slowly and movement of the rack shaft 12 is restricted. The dynamic restriction determination is performed to detect a state in which the operation of turning the steering wheel 3 is performed at a relatively high speed and the operation of returning the steering wheel is performed immediately after movement of the rack shaft 12 is restricted.

The restriction position determination angle acquisition unit 102 determines that the dynamic restriction determination is established, that is, determines that movement of the rack shaft 12 is restricted in the case where the following conditions are met. (B1) The absolute value of the steering torque Th is equal to or larger than a second steering torque threshold Tth2.

(B2) The sign of the motor angular velocity ωm is the same as the sign of the steering torque Th, and the absolute value of the motor angular velocity ωm is larger than the stop angular velocity threshold ωth_st. (B3) The sign of the angular velocity variation amount Δωm is opposite to the sign of the steering torque Th, and the absolute value of the angular velocity variation amount Δωm is larger than an abrupt angular velocity variation amount threshold Δωth_sc.

The second steering torque threshold Tth2 corresponds to steering torque at the time when the operation of returning the steering wheel 3 is performed immediately after the rack end 18 contacts the rack housing 13, and is set to an appropriate value that is smaller than the first steering torque threshold Tth1 and that is larger than zero. The abrupt angular velocity variation amount threshold Δωth_sc corresponds to an angular velocity variation amount indicating that the motor 21 is decelerating rapidly, and is set to a value that is larger than the stop angular velocity variation amount threshold Δωth_st.

The restriction position determination angle acquisition unit 102 determines that the static restriction determination is established, that is, determines that movement of the rack shaft 12 is restricted in the case where the following conditions are met. (C1) The absolute value of the steering torque Th is equal to or larger than the first steering torque threshold Tth1.

(C2) The sign of the motor angular velocity ωm is the same as the sign of the steering torque Th, and the absolute value of the motor angular velocity ωm is larger than the stop angular velocity threshold ωth_st and equal to or smaller than a low angular velocity threshold ωth_lo.

(C3) The absolute value of the angular velocity variation amount Δωm is smaller than the stop angular velocity variation amount threshold Δωth_st. The low angular velocity threshold ωth_lo corresponds to an angular velocity indicating that the motor 21 is rotating at a low speed, and is set to an appropriate value that is larger than zero.

Figure 10:
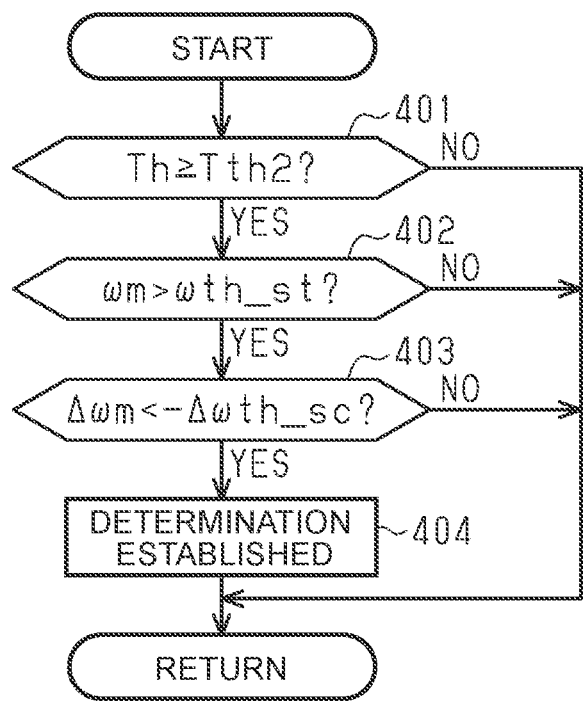
FIG. 10 is a flowchart illustrating the process procedure of a dynamic restriction determination.
Figure 11:
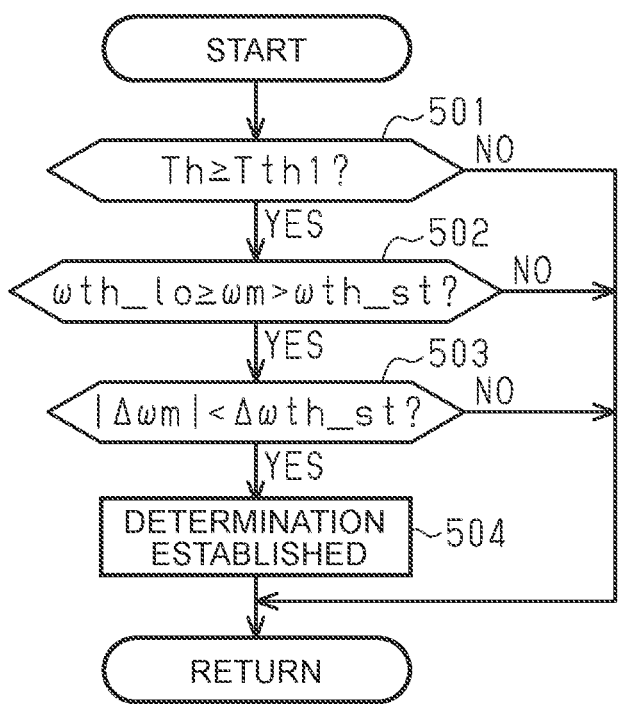
FIG. 11 is a flowchart illustrating the process procedure of a static restriction determination.

Next, an example of the procedure of the normal-time restriction position determination angle acquisition process will be described with reference to the flowchart illustrated in FIGS. 9 to 11. In the following, for convenience of description, the rack shaft 12 is moved rightward, and the restriction position determination angle θi for the right side is acquired. However, a similar process is performed also in the case where the rack shaft 12 is moved leftward and the restriction position determination angle θi for the left side is acquired.

Figure 9:
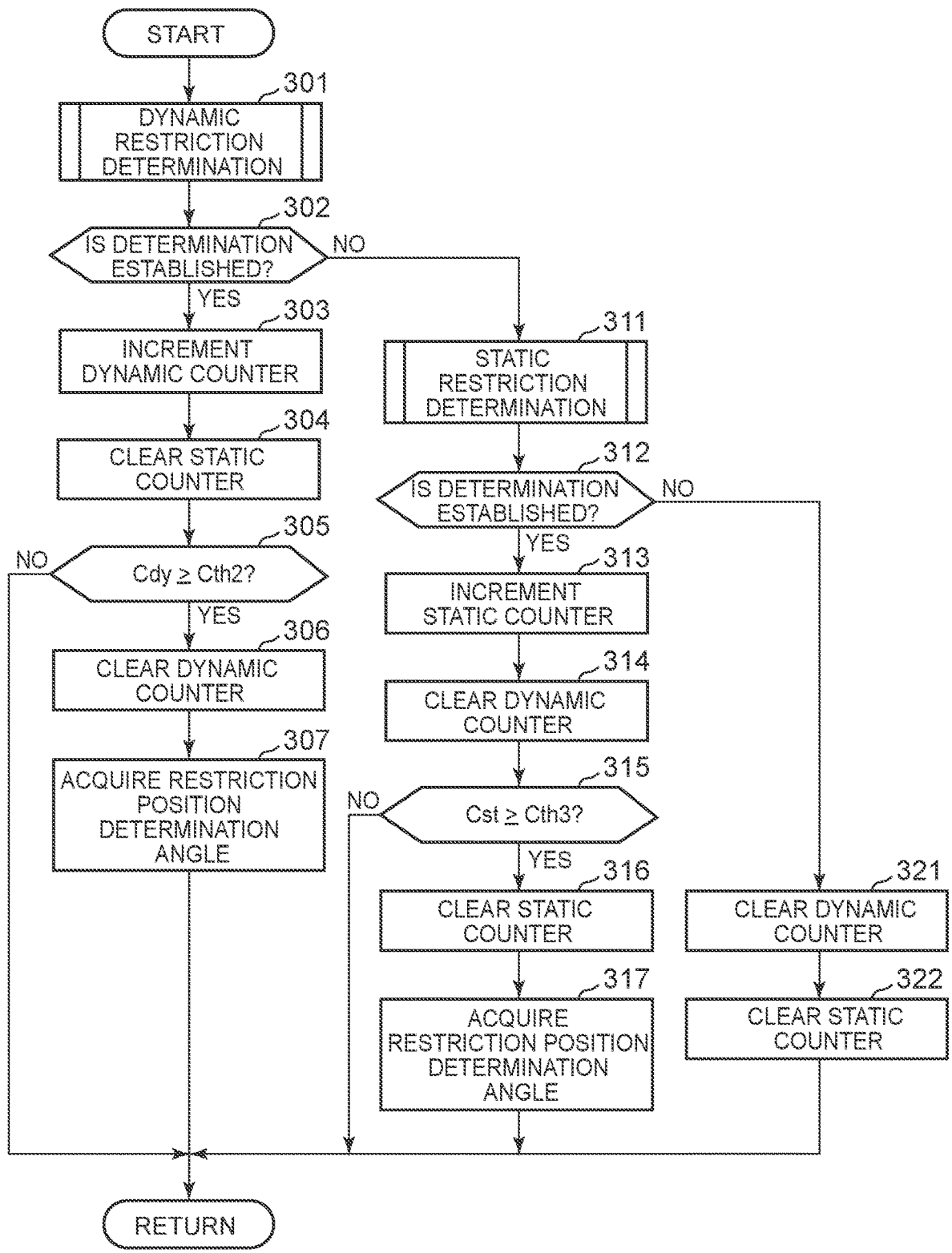
FIG. 9 is a flowchart illustrating the procedure of a normal-time restriction position determination angle acquisition process.

In the normal-time restriction position determination angle acquisition process, as illustrated in FIG. 9, the restriction position determination angle acquisition unit 102 first makes a dynamic restriction determination (step 301). In the dynamic restriction determination, as illustrated in FIG. 10, the restriction position determination angle acquisition unit 102 determines whether the steering torque Th is equal to or larger than the second steering torque threshold Tth2 (step 401). In the case where the steering torque Th is equal to or larger than the second steering torque threshold Tth2 (step 401: YES), it is determined whether the motor angular velocity ωm is larger than the stop angular velocity threshold ωth_st (step 402). That is, it is determined in step 402 whether the sign of the motor angular velocity ωm is the same as the sign of the steering torque Th and the absolute value of the motor angular velocity ωm is larger than the stop angular velocity threshold ωth_st. In the case where the motor angular velocity ωm is larger than the stop angular velocity threshold ωth_st (step 402: YES), it is determined whether the angular velocity variation amount Δωm is smaller than the negative abrupt angular velocity variation amount threshold Δωth_sc (step 403). That is, it is determined in step 303 whether the sign of the angular velocity variation amount Δωm is opposite to the sign of the steering torque Th and the absolute value of the angular velocity variation amount Δωm is larger than the abrupt angular velocity variation amount threshold Δωth_sc. In the case where the angular velocity variation amount Δωm is smaller than the negative abrupt angular velocity variation amount threshold Δωth_sc (step 403: YES), it is determined that the dynamic restriction determination is established and movement of the rack shaft 12 is restricted (step 404).

On the other hand, in the case where the steering torque Th is smaller than the second steering torque threshold Tth2 (step 401: NO), in the case where the motor angular velocity ωm is equal to or smaller than the stop angular velocity threshold ωth_st (step 402: NO), or in the case where the angular velocity variation amount Δωm is equal to or larger than the negative abrupt angular velocity variation amount threshold Δωth_sc (step 403: NO), no further processes are executed.

After making the dynamic restriction determination in step 301, as illustrated in FIG. 9, the restriction position determination angle acquisition unit 102 determines whether the determination is established (step 302). In the case where the dynamic restriction determination is established (step 302: YES), a count value Cdy of a dynamic counter which indicates the number of times that the dynamic restriction determination is established is incremented (step 303), and a count value Cst of a static counter which indicates the number of times that the static restriction determination is established is cleared (step 304). Subsequently, it is determined whether the count value Cdy of the dynamic counter is equal to or larger than a predetermined count value Cth2 corresponding to the second predetermined time (step 305). In the case where the count value Cdy is smaller than the predetermined count value Cth2 (step 305: NO), no further processes are executed.

In the case where the count value Cdy is equal to or larger than the predetermined count value Cth2 (step 305: YES), the restriction position determination angle acquisition unit 102 clears the count value Cdy of the dynamic counter (step 306). The restriction position determination angle θi is acquired by performing rigidity compensation on the absolute steering angle θs which is acquired in the same computation cycle (step 307).

In the case where the dynamic restriction determination is not established (step 302: NO), the restriction position determination angle acquisition unit 102 makes a static restriction determination (step 311). In the static restriction determination, as illustrated in FIG. 11, the restriction position determination angle acquisition unit 102 determines whether the steering torque Th is equal to or larger than the first steering torque threshold Tth1 (step 501). In the case where the steering torque Th is equal to or larger than the first steering torque threshold Tth1 (step 501: YES), it is determined whether the motor angular velocity ωm is larger than the stop angular velocity threshold ωth_st and equal to or smaller than the low angular velocity threshold ωth_lo (step 502). That is, it is determined in step 502 whether the sign of the motor angular velocity ωm is the same as the sign of the steering torque Th and the absolute value of the motor angular velocity ωm is larger than the stop angular velocity threshold ωth_st and equal to or smaller than the low angular velocity threshold ωth_lo. In the case where the motor angular velocity ωm is larger than the stop angular velocity threshold ωth_st and equal to or smaller than the low angular velocity threshold ωth_lo, that is, the motor 21 is rotating at an extremely low speed (step 502: YES), it is determined whether the absolute value of the angular velocity variation amount Δωm is smaller than the stop angular velocity variation amount threshold Δωth_st (step 503). In the case where the absolute value of the angular velocity variation amount Δωm is smaller than the stop angular velocity variation amount threshold Δωth_st (step 503: YES), it is determined that the static restriction determination is established and movement of the rack shaft 12 is restricted (step 504).

On the other hand, in the case where the steering torque Th is smaller than the first steering torque threshold Tth1 (step 501: NO), in the case where the motor angular velocity ωm is equal to or smaller than the stop angular velocity threshold ωth_st or larger than the low angular velocity threshold ωth_lo (step 502: NO), or in the case where the absolute value of the angular velocity variation amount Δωm is equal to or larger than the stop angular velocity variation amount threshold Δωth_st (step 503: NO), no further processes are executed.

After making the static restriction determination in step 311, as illustrated in FIG. 9, the restriction position determination angle acquisition unit 102 determines whether the determination is established (step 312). In the case where the static restriction determination is established (step 312: YES), the count value Cst of the static counter is incremented (step 313), and the count value Cdy of the dynamic counter is cleared (step 314). Subsequently, it is determined whether the count value Cst of the static counter is equal to or larger than a predetermined count value Cth3 corresponding to the third predetermined time (step 315). In the case where the count value Cst is smaller than the predetermined count value Cth3 (step 315: NO), no further processes are executed.

In the case where the count value Cst is equal to or larger than the predetermined count value Cth3 (step 315: YES), the restriction position determination angle acquisition unit 102 clears the count value Cst of the static counter (step 316). The restriction position determination angle θi is acquired by performing rigidity compensation on the absolute steering angle θs which is acquired in the same computation cycle (step 317).

In the case where the static restriction determination is not established (step 312: NO), that is, in the case where movement of the rack shaft 12 is not restricted, the restriction position determination angle acquisition unit 102 clears the count values Cdy and Cst of the dynamic counter and the static counter, respectively (steps 321 and 322).

Release-Time Restriction Position Determination Angle Acquisition Process

Next, the release-time restriction position determination angle acquisition process will be described. In the release-time restriction position determination angle acquisition process, the restriction position determination angle acquisition unit 102 makes a non-following determination and an additional restriction determination, and acquires the restriction position determination angle θi which is a release-time restriction position determination angle. Specifically, the restriction position determination angle acquisition unit 102 makes an additional restriction determination after a non-following determination is established continuously for a fourth predetermined time, and acquires, as the restriction position determination angle θi, an angle obtained by performing rigidity compensation on the absolute steering angle θs acquired at the time when the additional restriction determination is established continuously for a fifth predetermined time.

The non-following determination is performed to detect a state in which movement of the rack shaft 12 is restricted during execution of the partial release control. Particularly, during execution of the partial release control, the rack shaft 12 is moved at a speed corresponding to the target steering speed ωs* which is based on the steering torque Th as indicated by the formula (2) while the rack shaft 12 is moved from the virtual rack end position to the actual rack end position. After the rack shaft 12 is moved to the actual rack end position, the rack shaft 12 cannot be moved at a speed corresponding to the steering torque Th, even if the partial release control is executed, with movement of the rack shaft 12 mechanically restricted. In the non-following determination, in view of the above, a state in which movement of the rack shaft 12 is restricted is detected on the basis of whether the motor angular velocity cpm follows a value based on the target steering speed ωs*.

The additional restriction determination is performed to detect a state in which the operation of keeping the steering wheel 3 stationary is performed with movement of the rack shaft 12 kept restricted and a state in the operation of turning the steering wheel 3 is performed slowly and movement of the rack shaft 12 is restricted. In the present embodiment, the additional restriction determination is similar to the static restriction determination.

The restriction position determination angle acquisition unit 102 determines that the non-following determination is established, that is, determines that movement of the rack shaft 12 is restricted in the case where the following conditions are met. (D1) The absolute value of the q-axis current command value Iq* is equal to or larger than the steering angle limit value Ten.

(D2) The absolute value of the motor angular velocity cpm is smaller than a following-determination angular velocity threshold ωth_fo. (D3) The absolute value of the angular velocity variation amount Δωm is smaller than a start-determination angular velocity variation amount threshold Δωth_bg.

The absolute value of the q-axis current command value Iq* is limited to the limit value Ig or less by the upper limit guard processing unit 63 as described above. Therefore, the condition (D1) is also considered as the absolute value of the q-axis current command value Iq* being limited to the steering angle limit value Ten. The following-determination angular velocity threshold ωth_fo is a value obtained by multiplying the target steering speed ωs* by a conversion coefficient K5 and a determination coefficient K6. The conversion coefficient is a coefficient for converting rotation of the steering shaft 11 into rotation of the motor 21, and is set in advance. The determination coefficient K6 is an appropriate value that is smaller than "1", and is set to "0.5", for example. A value obtained by multiplying the target steering speed ωs* by the conversion coefficient K5 corresponds to the target angular velocity. The start-determination angular velocity variation amount threshold Δωth_bg is an angular velocity variation amount that may be obtained when the partial release control is started, and is set in advance.

The restriction position determination angle acquisition unit 102 determines that the additional restriction determination is established, that is, determines that movement of the rack shaft 12 is restricted in the case where the three conditions (C1) to (C3), which are the same as those for the static restriction determination, are met.

Next, an example of the procedure of the release-time restriction position determination angle acquisition process will be described with reference to the flowchart illustrated in FIG. 12. In the following, for convenience of description, the rack shaft 12 is moved rightward, and the restriction position determination angle θi for the right side is acquired. However, a similar process is performed also in the case where the rack shaft 12 is moved leftward and the restriction position determination angle θi for the left side is acquired.

Figure 12:
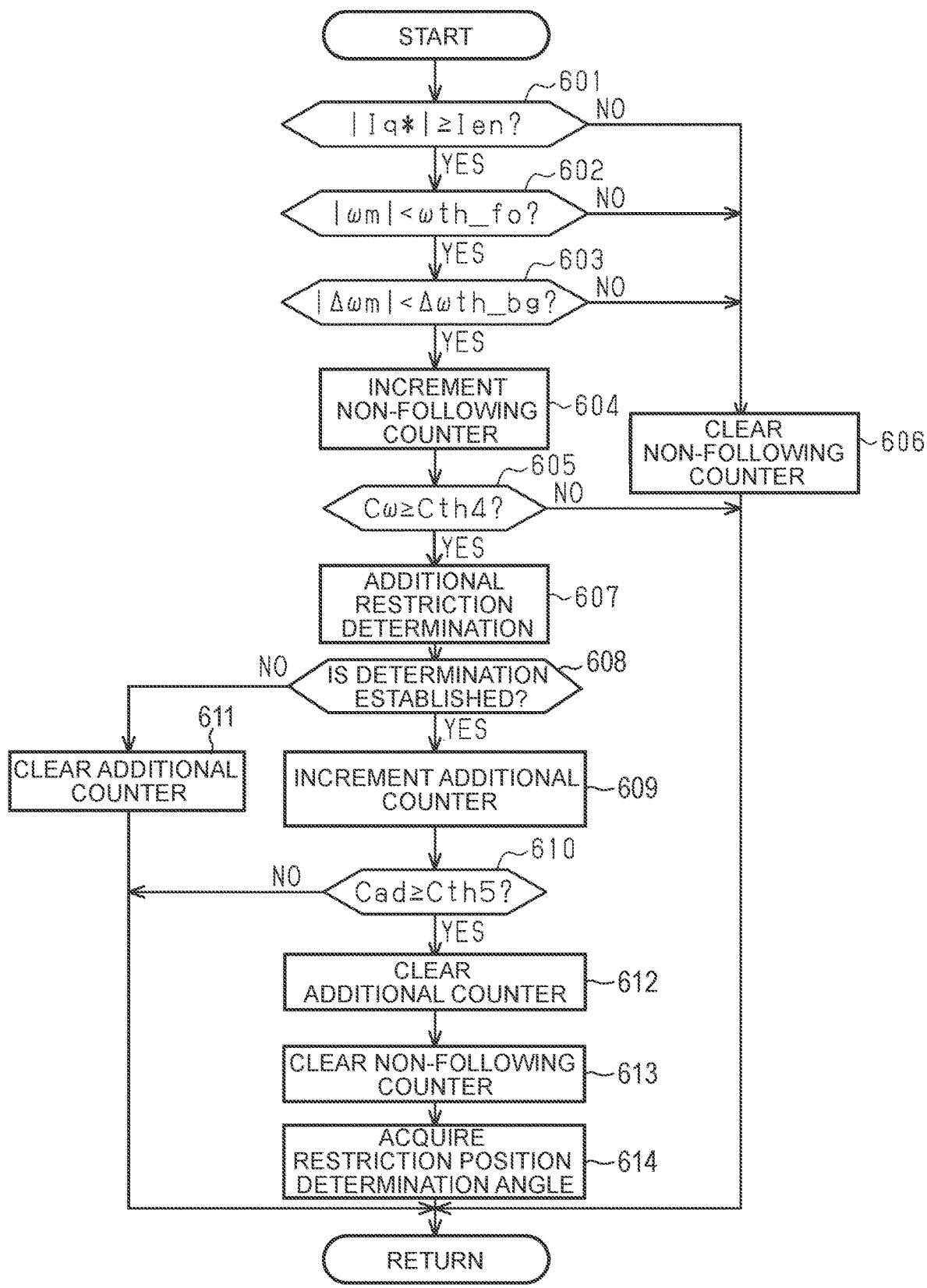
FIG. 12 is a flowchart illustrating the procedure of a release-time restriction position determination angle acquisition process.

In the release-time restriction position determination angle acquisition process, as illustrated in FIG. 12, the restriction position determination angle acquisition unit 102 first makes a non-following determination (steps 601 to 603). Specifically, in step 601, the restriction position determination angle acquisition unit 102 determines whether the absolute value of the q-axis current command value Iq* is equal to or larger than the steering angle limit value Ten. In the case where the absolute value of the q-axis current command value Iq* is equal to or larger than the steering angle limit value Ten (step 601: YES), it is determined whether the absolute value of the motor angular velocity ωm is smaller than the following-determination angular velocity threshold ωth_fo (step 602). In the case where the absolute value of the motor angular velocity ωm is smaller than the following-determination angular velocity threshold ωth_fo (step 602: YES), it is determined whether the absolute value of the angular velocity variation amount Δωm is smaller than the start-determination angular velocity variation amount threshold Δωth_bg (step 603). In the case where the absolute value of the angular velocity variation amount Δωm is smaller than the start-determination angular velocity variation amount threshold Δωth_bg (step 603: YES), it is determined that the non-following determination is established, and a count value Cw of a non-following counter which indicates the number of times that the non-following determination is established is incremented (step 604). Subsequently, it is determined whether the count value Cw of the non-following counter is equal to or larger than a predetermined count value Cth4 corresponding to the fourth predetermined time (step 605). In the case where the count value Cw is smaller than the predetermined count value Cth4 (step 605: NO), no further processes are executed.

In the case where the absolute value of the q-axis current command value Iq* is smaller than the steering angle limit value Ten (step 601: NO), the restriction position determination angle acquisition unit 102 clears the count value Cw of the non-following counter (step 606). In the case where the absolute value of the motor angular velocity cpm is equal to or larger than the following-determination angular velocity threshold ωth_fo (step 602: NO), or in the case where the absolute value of the angular velocity variation amount Δωm is equal to or larger than the start-determination angular velocity variation amount threshold Δωth_bg (step 603: NO), the process proceeds to step 606, and the count value Cw is cleared.

Subsequently, in the case where the count value Cw is equal to or larger than the predetermined count value Cth4 (step 605: YES), the restriction position determination angle acquisition unit 102 makes an additional restriction determination (step 607). The process procedure of the additional restriction determination is the same as that of the static restriction determination indicated in FIG. 11, and therefore will not be described.

After making the additional restriction determination in step 607, the restriction position determination angle acquisition unit 102 determines whether the additional restriction determination is established (step 608). In the case where the additional restriction determination is established (step 608: YES), a count value Cad of an additional counter which indicates the number of times that the additional restriction determination is established is incremented (step 609). Subsequently, it is determined whether the count value Cad of the additional counter is equal to or larger than a predetermined count value Cth5 corresponding to the fifth predetermined time (step 610). In the case where the count value Cad is smaller than the predetermined count value Cth5 (step 610: NO), no further processes are executed. In the case where the additional restriction determination is not established (step 608: NO), the count value Cad of the additional counter is cleared (step 611).

In the case where the count value Cad is equal to or larger than the predetermined count value Cth5 (step 610: YES), the restriction position determination angle acquisition unit 102 clears the count value Cad (step 612), clears the count value Cw (step 613), and acquires the restriction position determination angle θi by performing rigidity compensation on the absolute steering angle θs which is acquired in the same computation cycle (step 614).

Update Permission Unit 103

As illustrated in FIG. 6, the update permission unit 103 receives the restriction position determination angle θi as an input. The update permission unit 103 determines, on the basis of the variance of a plurality of restriction position determination angles θi on the right side or the left side, whether such data are obtained when movement of the rack shaft 12 is restricted by an end strike. The update permission unit 103 determines, on the basis of the sign of the restriction position determination angle θi, whether movement of the rack shaft 12 is restricted on the right side or the left side. In the case where the plurality of restriction position determination angles θi is obtained when movement of the rack shaft 12 is restricted by an end strike, the update permission unit 103 outputs end strike determination data DO, which include the plurality of restriction position determination angles θi, and an update permission signal Sp to the end position corresponding angle setting unit 104. The update permission signal Sp is a signal that permits the end position corresponding angle setting unit 104 to update the end position corresponding angles θs_le and θs_re which are stored in the memory 64.

In the following, for convenience of description, leftward movement of the rack shaft 12 is restricted a plurality of times, and a plurality of restriction position determination angles θi on the left side is acquired. However, a similar process is performed by the update permission unit 103 also in the case where a plurality of restriction position determination angles θi on the right side is acquired.

The update permission unit 103 computes a determined variance value Vd, which is to be determined, using the following formula (4) when a number n of acquired restriction position determination angles θi on the left side is equal to or larger than a predetermined number nca for computation. In the present embodiment, the predetermined number nca is "3".

$$Vd = \frac{1}{n-1} \sum_{i=1}^{n} (\theta i - \theta ave)^2 \quad (4)$$

Subsequently, the update permission unit 103 computes a variance ratio Rd (Rd=Vd/Vm) which is the ratio between the determined variance value Vd and a prescribed variance value Vm set in advance.

The restriction position determination angle θi which is acquired in the case where it is determined that movement of the rack shaft 12 is restricted through execution of the end strike relaxation control may be varied in accordance with the magnitude of the road friction μ, for example. On the other hand, the restriction position determination angle θi which is acquired in the case where it is determined that movement of the rack shaft 12 is restricted by an end strike is determined mechanically in accordance with the structure of the EPS 2, and therefore is less likely to be varied. Thus, it is considered that, in the case where the variance of the plurality of restriction position determination angles θi is small, movement of the rack shaft 12 cannot be restricted through execution of the end strike relaxation control which is based on the stored end position corresponding angles θs_le and θs_re, and movement of the rack shaft 12 is restricted by an end strike. That is, it is considered that the stored end position corresponding angle θs_le or θs_re deviates toward the neutral steering position with respect to the actual rack end angle which is the actual end angle at which an end strike actually occurs.

In view of this respect, the update permission unit 103 makes a magnitude comparison between the variance ratio Rd and a variance threshold Rth. The variance threshold Rth is a value that corresponds to the number n of acquired restriction position determination angles θi, and is set in advance. The update permission unit 103 determines that the plurality of restriction position determination angles θi is data acquired when movement of the rack shaft 12 is restricted by an end strike in the case where the variance ratio Rd is equal to or smaller than the variance threshold Rth. In the case where the variance ratio Rd is larger than the variance threshold Rth, the update permission unit 103 determines that the plurality of restriction position determination angles θi is not data acquired when movement of the rack shaft 12 is restricted by an end strike. In this case, the update permission unit 103 does not output the end strike determination data DO and the update permission signal Sp to the end position corresponding angle setting unit 104.

Subsequently, the update permission unit 103 computes a temporary end position determination angle θe_t on the basis of the plurality of restriction position determination angles θi which is determined as data acquired when movement of the rack shaft 12 is restricted by an end strike. The update permission unit 103 according to the present embodiment computes the average value of the plurality of restriction position determination angles θi as the temporary end position determination angle θe_t.

The update permission unit 103 computes the difference between the temporary end position determination angle θe_t and the left end position corresponding angle θs_le as a temporary end separation angle Δθ t. When the q-axis current command value Iq* which is limited through execution of the end strike relaxation control is equal to or smaller than a second current threshold Ith2 in the case where it is assumed that the end separation angle Δθ is the temporary end separation angle Δθ t, the update permission unit 103 determines that the end strike relaxation control is being executed normally, and does not permit update of the end position corresponding angles θs_le and θs_re. The second current threshold Ith2 according to the present embodiment is a threshold corresponding to a torque threshold based on the rated torque, and is set to 50% of the rated current Ir.

Specifically, the update permission unit 103 includes a map which has a similar tendency to the normal-time map of the angle limit component computation unit 84 and in which the vehicle speed SPD is fixed at zero. The update permission unit 103 computes a temporary angle limit component Iga_t that corresponds to the temporary end separation angle Δθ_t by referring to the map. In the case where the temporary angle limit component Iga_t is equal to or larger than 50% of the rated current Ir, the update permission unit 103 determines that the q-axis current command value Iq* is equal to or smaller than the second current threshold Ith2, and does not output the end strike determination data Dθ and the update permission signal Sp to the end position corresponding angle setting unit 104. After that, the update permission unit 103 discards the plurality of acquired restriction position determination angles θi, and repeatedly performs the process described above.

As described above, the steering angle limit value Ten which is the upper limit value of the q-axis current command value Iq* is computed by subtracting the angle limit component Iga from the rated current Ir. Therefore, if the angle limit component Iga is equal to or larger than 50% of the rated current, the steering angle limit value Ten is equal to or smaller than 50% of the rated current. Thus, the update permission unit 103 determines that the q-axis current command value Iq* is equal to or smaller than the second current threshold Ith2 in the case where the temporary angle limit component Iga_t is equal to or larger than 50% of the rated current Ir.

In the case where the temporary angle limit component Iga_t is smaller than 50% of the rated current Ir, the update permission unit 103 outputs the end strike determination data DO and the update permission signal Sp to the end position corresponding angle setting unit 104. After that, the update permission unit 103 discards the plurality of acquired restriction position determination angles θi, and repeatedly performs the process described above.

Next, an example of the process procedure for update permission performed by the update permission unit 103 will be described with reference to the flowchart illustrated in FIG. 13. In the following, for convenience of description, the rack shaft 12 is moved rightward, and the restriction position determination angle θi for the right side is acquired. However, a similar process is performed also in the case where the rack shaft 12 is moved leftward and the restriction position determination angle θi for the left side is acquired.

Specifically, when various state amounts are acquired (step 701), the update permission unit 103 determines whether the number n of acquired restriction position determination angles θi is equal to or larger than the predetermined number nca for computation (step 702). In the case where the number of acquired restriction position determination angles θi is smaller than the number nca for computation (step 702: NO), no further processes are executed.

In the case where the number n of acquired restriction position determination angles θi is equal to or larger than the predetermined number nca for computation (step 702: YES), the update permission unit 103 computes a determined variance value Vd using the formula (4), and computes a variance ratio Rd (step 703). Subsequently, a magnitude comparison is made between the variance ratio Rd and the variance threshold Rth (step 704). In the case where the variance ratio Rd is equal to or smaller than the variance threshold Rth (step 704: YES), a temporary end position determination angle θe_t is computed (step 705), and a temporary end separation angle Δθ_t is computed (step 706). A temporary angle limit component Iga_t at the temporary end separation angle Δθ_t is computed (step 707). It is determined whether the temporary angle limit component Iga_t is equal to or larger than 50% of the rated current Ir (step 708).

In the case where the temporary angle limit component Iga_t is smaller than 50% of the rated current Ir (step 708: NO), the update permission unit 103 outputs the update permission signal Sp and the end strike determination data DO to the end position corresponding angle setting unit 104 (steps 709 and 710). Subsequently, the plurality of acquired restriction position determination angles θi is discarded (step 711).

In the case where the variance ratio Rd is larger than the variance threshold Rth (step 704: NO), the update permission unit 103 does not execute the processes in steps 705 to 710, and proceeds to step 711 to discard the plurality of acquired restriction position determination angles θi. In the case where the temporary angle limit component Iga_t is equal to or larger than 50% of the rated current Ir (step 708: YES), the processes in steps 709 and 710 are not executed, and the process proceeds to step 711 to discard the plurality of acquired restriction position determination angles θi.

End Position Corresponding Angle Setting Unit 104

As illustrated in FIG. 6, the end position corresponding angle setting unit 104 receives the end strike determination data DO and the update permission signal Sp as inputs. The end position corresponding angle setting unit 104 updates only one of the end position corresponding angles θs_le and θs_re on the side corresponding to the end strike determination data Δθ on the basis of the end strike determination data DO. By way of example, the end position corresponding angle setting unit 104 sets the average value of the end strike determination data DO as one of the end position corresponding angles θs_le and θs_re on the side corresponding to the end strike determination data Δθ.

Next, the function and the effect of the present embodiment will be described. (1) The current command value computation unit 51 performs partial release control for reducing the correction amount for the q-axis current command value Iq* determined through execution of the end strike relaxation control, on the basis of the steering torque Th in the case where it is determined that the driver attempts to turn the vehicle during execution of the end strike relaxation control. Consequently, a limitation on the q-axis current command value Iq* due to execution of the end strike relaxation control is partially released to increase the q-axis current command value Iq*. Thus, the partial release control is executed to increase the q-axis current command value Iq* when the driver attempts to turn the vehicle, even if movement of the rack shaft 12 is restricted at the virtual rack end position through execution of the end strike relaxation control, for example. Therefore, the rack shaft 12 can be moved to the actual rack end position. As a result, it is possible to restrain a reduction in the vehicle performance in making sharp turns.

The end position corresponding angle management unit 65 permits update of each of the end position corresponding angles θs_le and θs_re on the basis of the plurality of restriction position determination angles θi, and updates each of the end position corresponding angles θs_le and θs_re which are stored in the memory 64. Therefore, deviation between the actual rack end angle and each of the stored end position corresponding angles θs_le and θs_re can be reduced, even if such deviation occurs, by replacing the steering shaft 11 when repairing the vehicle, for example.

The restriction position determination angles θi include those acquired in the release-time restriction position determination angle acquisition process. In the release-time restriction position determination angle acquisition process, the restriction position determination angles θi are acquired after the rack shaft 12 is brought closer to the actual rack end position than the virtual rack end position through execution of the partial release control. Therefore, it is considered that the restriction position determination angles θi are approximate to the actual rack end angle. Thus, the end position corresponding angle management unit 65 can accurately determine whether each of the end position corresponding angle θs_le and θs_re needs to be updated on the basis of the restriction position determination angles θi which are close to the actual rack end angle.

(2) The update permission unit 103 permits update of each of the end position corresponding angles θs_le and θs_re on the basis of not only the restriction position determination angles θi which are acquired through the release-time restriction position determination angle acquisition process but also the restriction position determination angles θi which are acquired through the normal-time restriction position determination angle acquisition process. Therefore, each of the end position corresponding angles θs_le and θs_re can be updated even in the case where the deviation between the actual rack end angle and each of the stored end position corresponding angles θs_le and θs_re is so large that the rack shaft 12 may strike the rack housing 13 before the end strike relaxation control is executed, for example.

(3) The current command value computation unit 51 includes the steering angle limit value computation unit 71 which computes the steering angle limit value Ten which decreases on the basis of a decrease in the end separation angle Δθ in the case where the end separation angle Δθ is equal to or smaller than the predetermined angle θa. The current command value computation unit 51 executes the end strike relaxation control by limiting the absolute value of the q-axis current command value Iq* to the steering angle limit value Ten. The conditions under which the non-following determination is established include the absolute value of the q-axis current command value Iq* being equal to or larger than the steering angle limit value Ten, that is, the q-axis current command value Iq* being a maximum value in a state in which a limitation on the q-axis current command value Iq* is released through the partial release control. Consequently, it is possible to reduce the possibility that an erroneous determination that movement of the rack shaft 12 is restricted is made due to making a non-following determination in a state where sufficient motor torque is not output immediately after the start of the partial release control.

(4) The conditions under which the non-following determination is established include the absolute value of the motor angular velocity ωm being smaller than the following-determination angular velocity threshold ωth_fo. Therefore, it is possible to suitably determine whether the motor angular velocity ωm follows a target angular velocity during execution of the partial release control.

(5) Immediately after the partial release control is started, the motor 21 is accelerating, but the motor angular velocity ωm is still substantially zero, and does not follow the target angular velocity. In the present embodiment, in view of this respect, the conditions under which the non-following determination is established include the absolute value of the angular velocity variation amount Δωm being smaller than the start-determination angular velocity variation amount threshold Δωth_bg and the motor 21 not accelerating significantly. Therefore, it is possible to reduce the possibility that an erroneous determination that movement of the rack shaft 12 is restricted is made immediately after the start of the partial release control.

(6) In the release-time restriction position determination angle acquisition process, the restriction position determination angle acquisition unit 102 acquires the restriction position determination angle θi in the case where the additional restriction determination is established after the non-following determination is established. The non-following determination may be established also in the case where the rotational direction of the motor 21 is momentarily opposite to the steering direction. Therefore, when the restriction position determination angle θi is acquired at the moment when the rotational direction of the motor 21 is opposite to the steering direction, the restriction position determination angle θi may deviate from the actual rack end angle. In the present embodiment, in this respect, the restriction position determination angle θi is acquired in the case where the sign of the motor angular velocity ωm is the same as the sign of the steering torque Th and the absolute value of the motor angular velocity ωm is larger than the stop angular velocity threshold ωth_st, that is, in the case where the rotational direction of the motor 21 is the same as the steering direction. Therefore, it is possible to restrain deviation of the restriction position determination angle θi from the actual rack end angle.

The present embodiment may be modified as follows. The present embodiment and the following modifications can be combined with each other unless such an embodiment and modifications technically contradict with each other. In the embodiment described above, the motor angular velocity ωm which has been subjected to a low-pass filter process may be used to make the non-following determination. In this case, the variation amount of the motor angular velocity ωm which has been subjected to a low-pass filter process may be used as the angular velocity variation amount Δωm to make the non-following determination.

In the embodiment described above, the end position corresponding angle setting unit 104 updates only one of the end position corresponding angles θs_le and θs_re on the side corresponding to the end strike determination data DO in the case where the update permission signal Sp is input. However, the disclosure is not limited thereto. For example, the end position corresponding angles θs_le and θs_re on both the right and left sides may be updated. In this event, an appropriate method may be adopted to learn the end position corresponding angles θs_le and θs_re. In addition, the average value of the end strike determination data DO may not be set as one of the end position corresponding angles θs_le and θs_re on the corresponding side, and the restriction position determination angle θi with the largest absolute value, among the end strike determination data DO, may be set as one of the end position corresponding angles θs_le and θs_re on the corresponding side, for example. Further, the end position corresponding angle setting unit 104 may acquire the restriction position determination angle θi separately, without using the end strike determination data DO, and update each of the end position corresponding angles θs_le and θs_re on the basis of the restriction position determination angle θi.

In the embodiment described above, the update permission unit 103 determines whether each of the end position corresponding angles θs_le and θs_re which are stored in the memory 64 needs to be updated on the basis of the variance of the plurality of restriction position determination angles θi. However, the disclosure is not limited thereto. For example, it may be determined that the end position corresponding angle θs_le or θs_re needs to be updated in the case where the absolute value of the restriction position determination angle θi is larger than the absolute value of the end position corresponding angle θs_le or θs_re on the corresponding side.

In the embodiment described above, the restriction position determination angle acquisition unit 102 may be configured to execute only one of the static restriction determination and the dynamic restriction determination as the normal-time restriction position determination angle acquisition process. Alternatively, the restriction position determination angle acquisition unit 102 may be configured not to execute the normal-time restriction position determination angle acquisition process, and may be configured to execute only the release-time restriction position determination angle acquisition process.

In the embodiment described above, the conditions under which the non-following determination is established are changeable as appropriate. For example, at least one of the conditions (D1) and (D3) may not be used. Alternatively, other conditions such as a condition that the angle limit component Iga is not zero, for example, may be added.

In the embodiment described above, it may be determined that the non-following determination is established in the case where the conditions (D1) to (D3) are met, for example, irrespective of whether establishment of such conditions continues for the fourth predetermined time. Similarly, it may also be determined that each of the additional restriction determination, the dynamic restriction determination, the static restriction determination, and the turn intention determination is established irrespective of whether establishment of such determination conditions continues for a predetermined time.

In the embodiment described above, the conditions for the dynamic restriction determination and the conditions for the static restriction determination are changeable as appropriate. In the embodiment described above, the additional restriction determination is the same as the static restriction determination. However, the disclosure is not limited thereto. The additional restriction determination may be made in accordance with only whether the sign of the motor angular velocity ωm is the same as the sign of the steering torque Th and the absolute value of the motor angular velocity ωm is larger than the stop angular velocity threshold ωth_st, for example.

In the embodiment described above, each of the end position corresponding angles $\theta s\_le$ and $\theta s\_re$ may be updated in the case where it is determined that the variance ratio Rd is equal to or smaller than the variance threshold Rth and the plurality of restriction position determination angles $\theta i$ is data acquired when movement of the rack shaft 12 is restricted by an end strike, irrespective of whether the q-axis current command value Iq* is limited to the second current threshold Ith2 or less.

In the embodiment described above, the pinion shaft torque Tp is computed on the basis of the steering torque Th, the motor torque, and the inertial torque. However, the disclosure is not limited thereto. The pinion shaft torque Tp may be computed on the basis of the steering torque Th and the motor torque, for example, for the purpose of reducing the computation load etc.

In the embodiment described above, the restriction position determination angle acquisition unit 102 may not perform rigidity compensation, and may acquire the absolute steering angle $\theta s$ at the time when it is determined that movement of the rack shaft 12 is restricted without changing it, as the restriction position determination angle $\theta i$.

In the embodiment described above, the release-time end separation angle $\Delta\theta'$ is computed by adding the offset steering angle $\theta off$ to the end separation angle $\Delta\theta$. However, the disclosure is not limited thereto. For example, a release-time absolute steering angle $\theta s'$ may be computed by subtracting the offset steering angle $\theta off$ from the absolute steering angle $\theta s$, and a value that indicates the separation of the absolute steering angle $\theta s'$ from each of the end position corresponding angles $\theta s\_le$ and $\theta s\_re$ may be computed as the release-time end separation angle $\Delta\theta'$.

In the embodiment described above, the map computation unit 91 may be configured to include a normal-time map and a release-time map in which the horizontal axis of the normal-time map is offset in accordance with the offset steering angle $\theta off$, and the map computation unit 91 may be configured not to receive the release-time end separation angle $\Delta\theta'$ as an input. With this configuration as well, the horizontal axis is offset in accordance with the offset steering angle $\theta off$ in the release-time map, and therefore the release-time angle limit component Iga" which is smaller than the normal-time angle limit component Iga can be computed as in the present embodiment.

In the embodiment described above, the partial release control is stopped in the case where the normal-time angle limit component Iga is smaller than the first current threshold Ith1 due to execution of the partial release control, after execution of the partial release control. However, the disclosure is not limited thereto. The partial release control may be stopped in the case where any of the conditions (A1) to (A5) is not met, for example, even if the angle limit component Iga is equal to or larger than the first current threshold Ith1.

In the embodiment described above, the steering angle limit value Ten may be equal to or larger than the limit threshold Ith_lim during execution of the partial release control. In the embodiment described above, the elastic modulus K1 and the inertia coefficient J are each set to zero, and the target steering speed ωs* is computed using the formula (2). However, the disclosure is not limited thereto. For example, at least one of the elastic modulus K1 and the inertia coefficient J may not be set to zero. In this case, the target steering speed ωs* can be computed using the actual absolute steering angle $\theta s$ and steering angular velocity, for example, in addition to the steering torque Th. Alternatively, a map that indicates the relationship between the steering torque Th and the offset steering angle $\theta off$ may be set, for example, instead of using a model formula, and the offset steering angle $\theta off$ which corresponds to the steering torque may be computed by referring to the map.

In the embodiment described above, the partial release control is executed by computing the offset steering angle $\theta off$ on the basis of the steering torque Th, and computing the release-time angle limit component Iga", which is smaller than the normal-time angle limit component Iga, on the basis of the offset steering angle $\theta off$. However, the disclosure is not limited thereto. For example, the partial release control may be executed by computing the release-time angle limit component Iga" which decreases in accordance with the lapse of time since the start of the partial release control. In this case, the target steering speed ωs* can be computed in accordance with the variation amount of the release-time angle limit component Iga", for example.

In the embodiment described above, the conditions for the turn intention determination are changeable as appropriate. For example, it may not be determined whether one of the conditions (A4) and (A5) is met, or it may be determined whether the yaw rate of the vehicle is equal to or larger than a yaw rate threshold which indicates a turning state, in place of the condition (A3), for example. Further, a steering speed ωs may be used in place of the motor angular velocity cpm in the conditions (A4) and (A5), for example. Furthermore, the conditions (C1) to (C3) may be used in place of the conditions (A2), (A4), and (A5).

In the embodiment described above, the correction amount for the q-axis current command value Iq* is reduced by computing a large steering angle limit value Ten by subtracting, from the rated current Ir, the release-time angle limit component Iga" which is smaller than the normal-time angle limit component Iga in the case where it is determined that the driver attempts to turn the vehicle during execution of the end strike relaxation control. However, the disclosure is not limited thereto. The manner of executing the partial release control is changeable as appropriate. The correction amount for the q-axis current command value Iq* may be reduced by directly correcting the steering angle limit value Ten so as to increase the steering angle limit value Ten, for example, during execution of the partial release control.

In the embodiment described above, the absolute motor angle and the absolute steering angle θs are computed by integrating the rotational speed (i.e., the number of rotations) of the motor 21 from the origin at all times, by monitoring rotation of the motor 21 also when the ignition switch is turned off. However, the disclosure is not limited thereto. For example, the absolute motor angle and the absolute steering angle θs may be computed by providing a steering sensor that detects a steering angle as an absolute angle, and integrating the rotational speed (i.e., the number of rotations) of the motor 21 from the origin on the basis of the steering angle which is detected by the steering sensor and the speed reduction ratio of the speed reduction mechanism 22.

In the embodiment described above, the end strike relaxation control is executed by limiting the assist command value Ias* to the steering angle limit value Ten. However, the disclosure is not limited thereto. For example, the end strike relaxation control may be executed by adding a steering reaction force component that increases toward the rack end position, that is, a component with a sign that is opposite to that of the assist command value Ias*, to the assist command value Ias*. With this configuration, the correction amount for the q-axis current command value Iq* can be reduced by reducing the steering reaction force component in accordance with the steering torque Th in the case where it is determined that the driver attempts to turn the vehicle during execution of the end strike relaxation control.

In the embodiment described above, a guard process in which the absolute value of the assist command value Ias* is limited to the limit value Ig or less is performed on the assist command value Ias*. However, the disclosure is not limited thereto. For example, the guard process may be performed on a value obtained by correcting the assist command value Ias* using a compensation amount based on a torque differential value obtained by differentiating the steering torque Th.

In the embodiment described above, the limit value setting unit 62 includes the voltage limit value computation unit 72 which computes the voltage limit value Ivb on the basis of the power source voltage Vb. However, the disclosure is not limited thereto. The limit value setting unit 62 may include a different computation unit that computes a different limit value based on a different state amount, in addition to or in place of the voltage limit value computation unit 72. Alternatively, the limit value setting unit 62 may not include the voltage limit value computation unit 72, and may be configured to set the steering angle limit value Ten without using it, as the limit value Ig.

In the embodiment described above, a value obtained by subtracting the normal-time angle limit component Iga or the release-time angle limit component Iga" from the rated current Ir is used as the steering angle limit value Ien. However, the disclosure is not limited thereto. A value obtained by subtracting the angle limit component Iga or the angle limit component Iga" and a current limit amount, which is determined in accordance with the motor angular velocity, from the rated current Ir may be used as the steering angle limit value Ien.

In the embodiment described above, the steering control device 1 controls the EPS 2 of a type in which the EPS actuator 6 applies motor torque to the column shaft 15. However, the disclosure is not limited thereto. For example, the steering control device 1 may control a steering system of a type in which motor torque is applied to the rack shaft 12 via a ball screw nut. Alternatively, the steering control device 1 may control a steering system of a steer-by-wire type in which a steering portion that is operated by the driver and a steered portion that steers the steered wheels are separated from each other in terms of power transfer, rather than the EPS, and the end strike relaxation control may be executed as in the present embodiment on a torque command value or a q-axis current command value for a motor of a steered actuator provided in the steered portion.

What is claimed is:

1. A steering control device configured to control a steering system including a housing, a steered shaft housed in the housing so as to reciprocate, and an actuator that applies motor torque for causing the steered shaft to reciprocate using a motor as a drive source, the steering control device comprising an electronic control unit configured to:

detect an absolute steering angle which is a rotational angle of a rotary shaft that is convertible into a steered angle of steered wheels coupled to the steered shaft, and which is indicated by an absolute angle in a range including a range exceeding 360°, compute a current command value corresponding to a target value for the motor torque output from the motor and a steering angle limit value, and control driving of the motor such that an actual current value supplied to the motor matches the current command value, wherein:

the electronic control unit stores an end position corresponding angle that indicates an end position at which movement of the steered shaft is restricted by an end strike in which the steered shaft contacts the housing, the end position corresponding angle being related to the absolute steering angle;

the electronic control unit is configured to execute end strike relaxation control for correcting the current command value, in a case where an end separation angle is equal to or smaller than a predetermined angle, such that a decrease in the end separation angle is restricted, the end separation angle indicating a separation of the absolute steering angle from the end position corresponding angle;

the electronic control unit is configured to execute partial release control for reducing a correction amount for the current command value determined through execution of the end strike relaxation control when a driver attempts to turn a vehicle during the execution of the end strike relaxation control, the correction amount for the current command value decreasing as a steering angle limit value increases;

the electronic control unit is configured to make a non-following determination, the non-following determination being determined when the movement of the steered shaft is restricted during execution of the partial release control, based on a degree to which an angular velocity of the motor follows a target angular velocity, and acquire a release-time restriction position determination angle that corresponds to the absolute steering angle detected at a time when the electronic control unit determines that the movement of the steered shaft is restricted by the non-following determination;

the electronic control unit is configured to permit update of the end position corresponding angle based on the release-time restriction position determination angle, and update the end position corresponding angle in a case where the update of the end position corresponding angle is permitted; and the electronic control unit is configured to make a normal-time end strike determination as to whether the movement of the steered shaft is restricted while the partial release control is not executed, and acquire a normal-time restriction position determination angle that corresponds to the absolute steering angle detected at a time when the movement of the steered shaft is determined to be restricted; and the electronic control unit is configured to permit the update of the end position corresponding angle based on a plurality of restriction determination angles including the release-time restriction position determination angle and the normal-time restriction position determination angle.

2. The steering control device according to claim 1, wherein:

the electronic control unit is configured to compute a steering angle limit value that decreases based on a decrease in the end separation angle in the case where the end separation angle is equal to or smaller than the predetermined angle;

the electronic control unit is configured to execute the end strike relaxation control by limiting an absolute value of the current command value to the steering angle limit value;

the electronic control unit is configured to compute an angle limit component that decreases based on an increase in the end separation angle, and compute the steering angle limit value based on a value obtained by subtracting the angle limit component from a rated current of the motor;

the electronic control unit is configured to compute the angle limit component such that the angle limit component computed during execution of the partial release control is smaller than the angle limit component computed while the partial release control is not executed; and a condition under which the non-following determination is established includes the absolute value of the current command value being equal to or larger than the steering angle limit value.

3. The steering control device according to claim 1, wherein a condition under which the non-following determination is established includes an absolute value of the angular velocity being smaller than a following-determination angular velocity threshold set based on the target angular velocity.

4. The steering control device according to claim 1, wherein a condition under which the non-following determination is established includes an absolute value of an angular velocity variation amount being smaller than a start-determination angular velocity variation amount threshold, the angular velocity variation amount being a variation amount of the angular velocity.

5. The steering control device according to claim 1, wherein:

each of a sign of steering torque and a sign of a rotational direction of the motor for moving the steered shaft in one direction is defined as positive and each of the sign of the steering torque and the sign of the rotational direction of the motor for moving the steered shaft in a direction that is opposite to the one direction is defined as negative; and the electronic control unit is configured to acquire the release-time restriction position determination angle in a case where a sign of the angular velocity is the same as the sign of the steering torque and an absolute value of the angular velocity is larger than a stop angular velocity threshold which indicates a stopped state of the motor after the electronic control unit determines that the movement of the steered shaft is restricted based on the non-following determination.

6. The steering control device according to claim 1, wherein:

immediately after the partial release control is executed, the motor accelerates and the angular velocity of the motor is zero and does not follow the target angular velocity.

* * * * *